(12) United States Patent
Otsubo

(10) Patent No.: US 7,139,971 B1
(45) Date of Patent: Nov. 21, 2006

(54) METHOD OF SEARCHING FOR AND RETRIEVING INFORMATION FROM STRUCTURE DOCUMENTS

(75) Inventor: Motohide Otsubo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/357,841

(22) Filed: Jul. 21, 1999

(51) Int. Cl.
G06F 17/00 (2006.01)

(52) U.S. Cl. .......................... 715/513; 707/3

(58) Field of Classification Search ............... 715/530, 715/513; 707/2, 3, 101, 4; 709/2, 203; 705/26; 704/2
See application file for complete search history.

(56) References Cited

U.S. PATENT DOCUMENTS

| | | | | |
|---|---|---|---|---|
| 5,133,052 | A | * | 7/1992 | Bier et al. .................. 715/530 |
| 5,548,508 | A | * | 8/1996 | Nagami ........................ 704/2 |
| 5,587,902 | A | * | 12/1996 | Kugimiya ...................... 704/2 |
| 5,649,218 | A | * | 7/1997 | Saito ........................... 715/513 |
| 5,737,737 | A | * | 4/1998 | Hikida et al. ............. 707/104.1 |
| 5,754,772 | A | * | 5/1998 | Leaf ........................... 709/203 |
| 5,761,656 | A | * | 6/1998 | Ben-Shachar ................. 707/4 |
| 5,897,622 | A | * | 4/1999 | Blinn et al. ................... 705/26 |
| 6,077,085 | A | * | 6/2000 | Parry et al. ................. 434/322 |

FOREIGN PATENT DOCUMENTS

| | | |
|---|---|---|
| JP | 2-130673 | 5/1990 |
| JP | 05-225240 | 9/1993 |
| JP | 6-28403 | 2/1994 |
| JP | 6-259421 | 9/1994 |
| JP | 6-309365 | 11/1994 |
| JP | 6-325087 | 11/1994 |
| JP | 7-56908 | 3/1995 |
| JP | 7-175811 | 7/1995 |
| JP | 8-339370 | 12/1996 |
| JP | 8-348586 | 7/1998 |

OTHER PUBLICATIONS

GNU Project, "UNIX Man pages: grep", 1994, Last change Nov. 22, 1998.*
Jaakkola, Jani, et al., "sgrep: search a file for a structured pattern", Last change Apr. 29, 1996.*
Costales, Bryan, "C from A to Z", 1985, Prentice-Hall, p. 41, 236, 237.*
Hahn, Harley. "Harley Hahn's A Student's Guide to Unix", 1996, WCB/Mc-Graw Hill, p. 316-317.*
Microsoft Corporation, "User's Guide: Microsoft Word", 1993-1994, Microsoft Corporation, Version 6.0, p. 59.*
Catapult, Inc., "Microsoft Word: Step by Step", 1997, Microsoft Press, Word 97, pp. 89, 191-192, 197-198.*
Hara, Miyazawa, and Negishi. "Search service for global database at the Science Information Center," Joho Shori Gakkai Kenkyu Joho, vol. 91, No. 41; May 21, 1991 91-IS-34-2.

* cited by examiner

Primary Examiner—Heather R. Herndon
Assistant Examiner—Adam Queler
(74) Attorney, Agent, or Firm—Foley & Lardner LLP

(57) ABSTRACT

A technique of editing a plurality of structured documents is disclosed. A plurality of structured documents are inputted in a document edit system. Thereafter, a plurality of elements are extracted from each of the plurality of structured documents using an element edit statement which indicates element to be extracted. The extraction of the elements is implemented while the relationship of the elements extracted is maintained.

21 Claims, 29 Drawing Sheets

FIG. 13

```
<list a >

< element>                        54'

<name>
   Taro SATO
  </name>

<title>
   DEF REPORT
  </title>

</element>

<element>

<name>
   Hanako SUZUKI
  </name>

<title>
   DEF REPORT
  </title>

</element>

<element>

<name>
   JIRO NAKAMURA
  </name>

<title>
   ANALYSIS OF JKL
  </title>

</element>

.....
</list a>
```

FIG. 18

```
<paper>

<first-p>
    In Fig. 1,...

<figure>
    Fig. 1
    </figure>

</first-p>

<second-p>
    In Fig. 2,...

<figure>
    Fig. 2
    </figure>

</second-p>

</paper>
```
— 120

FIG. 21

```
<list c >

< element>

<title of paper>
    DEF REPORT
    </title of paper>

<number of authors>
    2
    </number of authors>

</element>

<element>

<list of paper>
    ANALYSIS OF JKL
    </list of paper>

<number of authors>
    1
    </number of authors>

</element>

.....

<total number>
    10
    </total number>

</list c>
```
— 150'

FIG. 31(A)

400 — OUTPUT DOCUMENT

LIST C

| TITLE OF PAPER | NUMBER OF AUTHORS |
|---|---|
| DEF REPORT | 2 |
| TOTAL NUMBER | 2 |

FIG. 31(B)

402 — OUTPUT DOCUMENT

LIST C

| TITLE OF PAPER | NUMBER OF AUTHORS |
|---|---|
| DEF REPORT | 2 |
| ANALYSIS OF JKL | 1 |
| TOTAL NUMBER | 3 |

FIG. 31(C)

404 — OUTPUT DOCUMENT

LIST C

| TITLE OF PAPER | NUMBER OF AUTHORS |
|---|---|
| ANALYSIS OF JKL | 1 |
| TOTAL NUMBER | 1 |

METHOD OF SEARCHING FOR AND RETRIEVING INFORMATION FROM STRUCTURE DOCUMENTS

BACKGROUND OF THE INVENTION

1. Field of the Invention

The present invention relates generally to document editing techniques. More specifically, the present invention relates to document editing techniques for extracting elements of structured documents and generating a desired output document.

2. Description of the Related Art

It is known in the art to extract necessary elements from a plurality of documents and deal with them for generating an output document. A conventional editing technique for obtaining such an output document is disclosed in Japanese Laid-open Patent Application No. 6-259421. According to this conventional technique, the elements of the structured input document are extracted using matches of character sequences with the elements in the document, a sequence connector, a hierarchy connector, etc.

However, the aforesaid conventional technique is not provided with an element connector and thus, it is undesirably required to use one character pattern for establishing a match with the element in the document and extracting the matched element. In other words, if a plurality of different elements are to be extracted, the same number of different character patterns are necessary.

Further, the aforesaid conventional technique is unable to extract a plurality of elements while maintaining relationship of the elements extracted. This is because the elements extracted using different character patterns are independent with one another.

The conventional technique in question is provided with a sequence connector for extracting a plurality of elements in sequence. However, the conventional technique is not provided with any connector via which a plurality of elements are extracted in parallel in any order. Therefore, it is difficult to extract a plurality of elements from input documents if the arrangement order of elements is

SUMMARY OF THE INVENTION

It is therefore an object of the present to provide to overcome the above-mentioned difficulties of the conventional editing techniques.

In brief, the object is achieved by a technique of editing a plurality of structured documents. A plurality of structured documents are inputted in a document edit system. Thereafter, a plurality of elements are extracted from each of the plurality of structured documents using an element edit statement which indicates element to be extracted. The extraction of the elements is implemented while the relationship of the elements extracted is maintained.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 13 is a diagram showing a structured document that corresponds to the output document of FIG. 11;

FIG. 18 is a diagram showing a structured document used in another example of the first embodiment;

FIG. 21 is a diagram showing a structured documents that corresponds to the output document of FIG. 11;

FIGS. 31(A) to 31(C) are each showing an output document obtained in the third embodiment.

DETAILED DESCRIPTION OF THE PREFERRED EMBODIMENTS

Preferred embodiments of the present invention will be described with reference to the accompanying drawings. Throughout the instant disclosure, it is assumed, for a convenience of description, that the document to be processed or edited is an SGML structured document. However, the present invention is applicable to the documents other than SGML ones on the condition that the document is tagged or hierarchically structured.

Before turning to the concrete embodiments, it is preferable to define edit operators and notations, both used in the instant invention.

Figure 1:
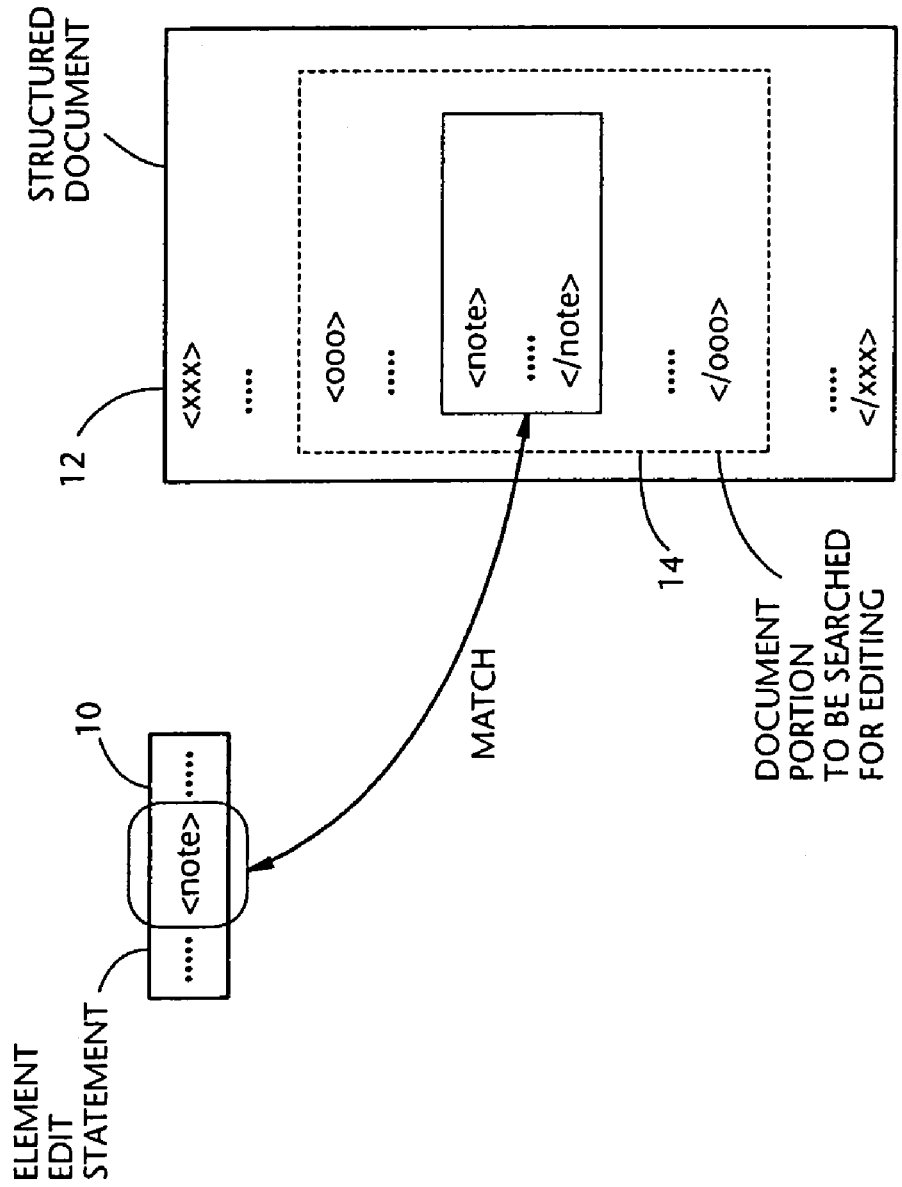
FIGS. 1 to 9 are each diagram for describing connectors and notations used in the present invention.

(a) Tag:

Tags are delimited using the '<' and '>' characters. Tags are used to define an element which is identified component of a document. The element usually consists of a start-tag, content and an end-tag. However, an element may involve one or more elements. The end-tag is delimited by '</'and'>'. Element matching operation using the tag is briefly described with reference to FIG. 1. As shown in FIG. 1, an element edit statement 10 includes a tag <note>. A reference numeral 12 denotes a structured document. The tag <note> in the element edit statement 10 is used to implement the element matching with one or more elements involved in a document portion 14 that is an document area to be searched. If the document portion 14 contains an element named <note>, a match is established.

(b) Character Pattern:

The character pattern, which consists of normal text characters (such as typically used in UNIX commands) of a character sequence, is delimited or defined using the "(left double quotation mark) and" (right double quotation mark).

Figure 2:
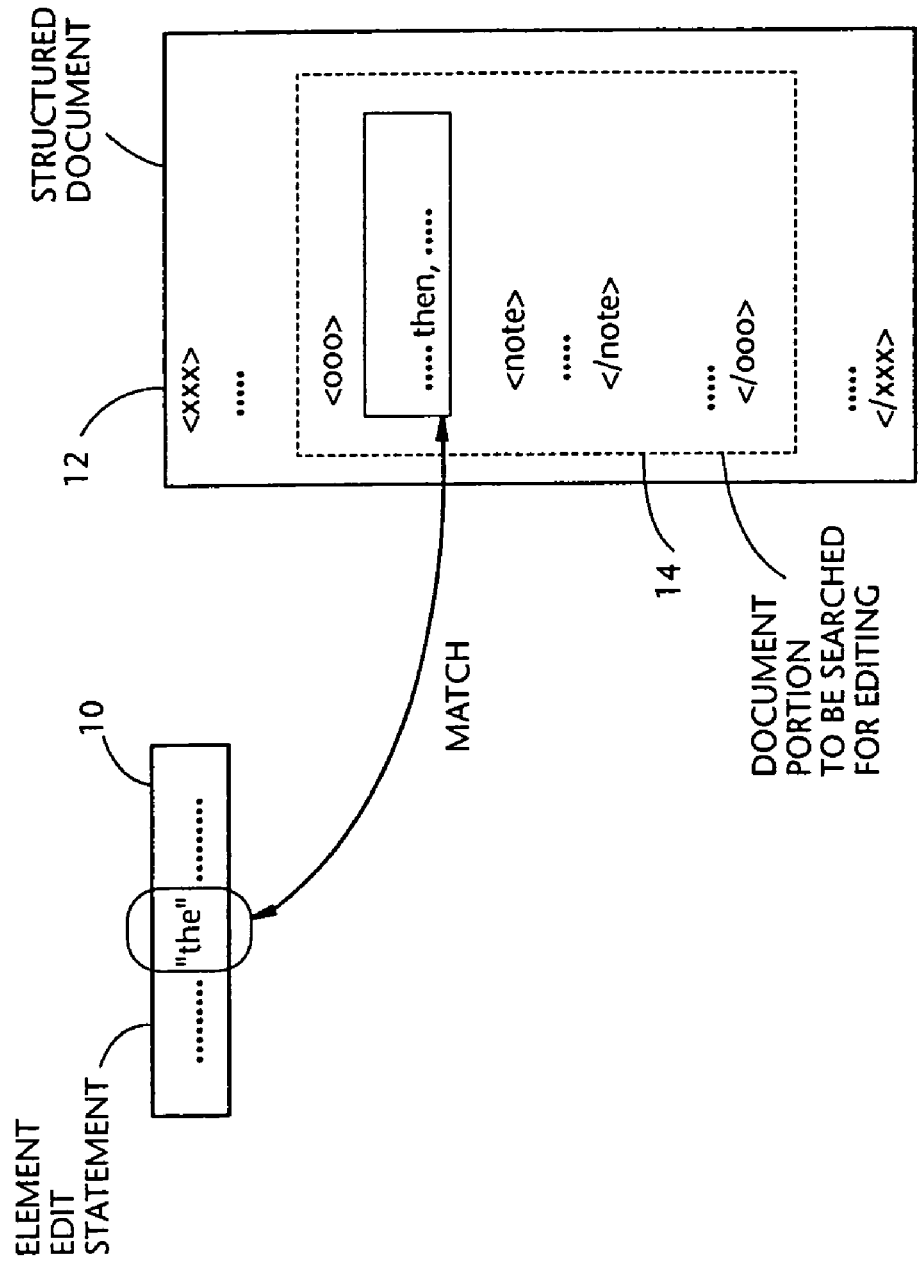

The character pattern is used to search for document data which includes at least one character sequence defined by the character pattern. That is, the existence of document data is ascertained if a match is established between the character pattern and the document data. In the instant disclosure, the document data signifies a document portion excluding tags. One example of matching using character pattern is described with reference to FIG. 2. As shown in FIG. 2, the element edit statement 10 includes a character pattern "the". The structured document 12 involves an element defined by <ooo> and </ooo> which contains a character sequence of "the" and thus, a match is established between character pattern "the" and the document data within the element defined by <ooo> and </ooo>.

Figure 3:
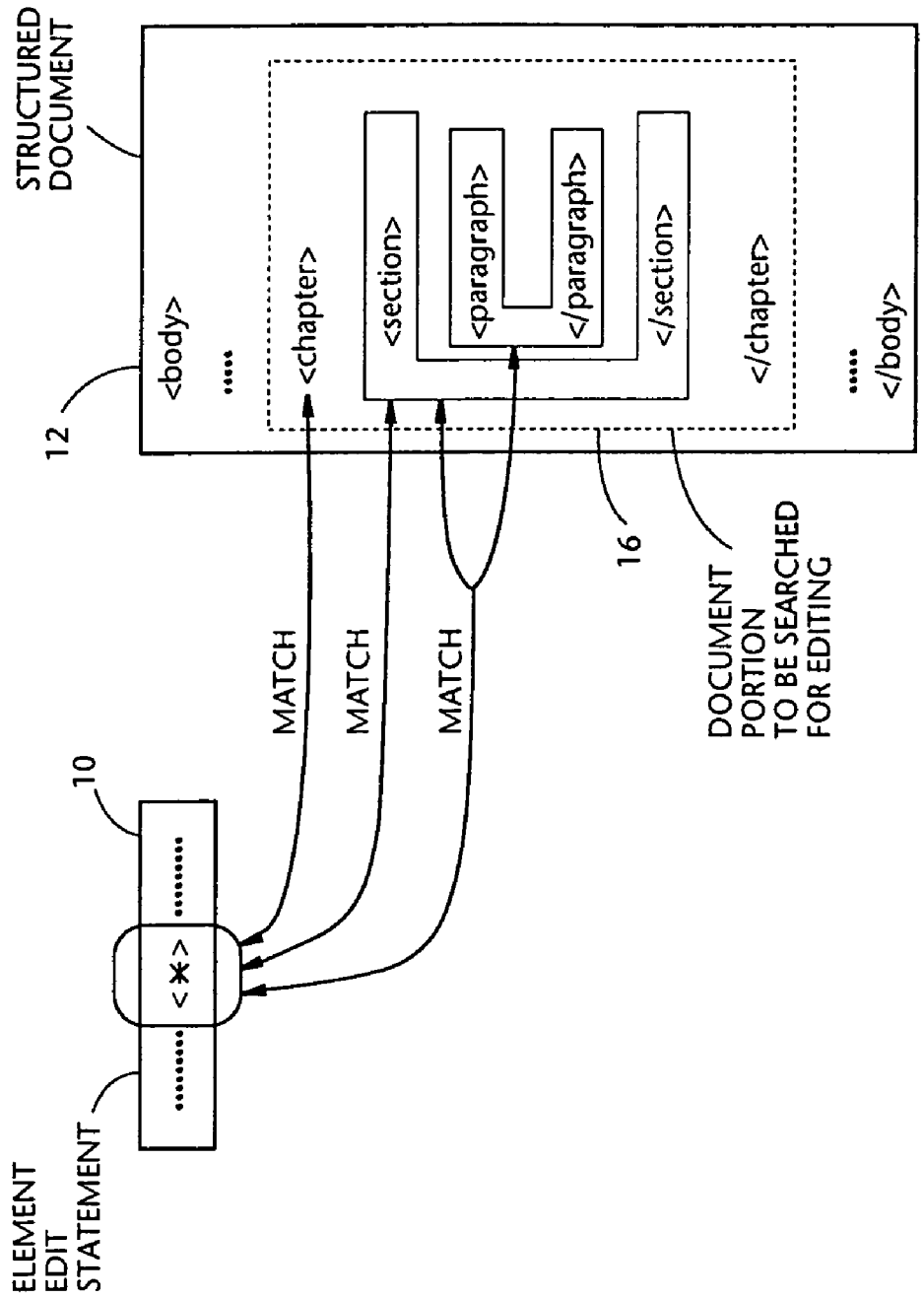

(c) Wild Card Tag <*>:

The wild card tag is defined by the '*' character delimited using '<' and '>', and matches each of document elements hierarchically structured. One example of matching of the wild card tag <*> with the document elements is shown in FIG. 3. As shown in FIG. 3, the element edit statement 10 includes the wild card tag <*>. The structured document 12 includes a document portion 16 to be searched for editing, which portion includes a hierarchy formed by "character", "section", and "paragraph". In the case shown in FIG. 3, the following matches are established.

(c-1) The wild card tag <*> matches "zero" hierarchical layer (viz., matches "vacant" structure) in connection with "chapter".

(c-2) The wild card tag <*> matches the hierarchical layer (viz., element) of "section".

(c-3) The wild card tag <*> matches the hierarchical layer (viz., element) named "paragraph" within the element of "section".

(d) Negation Indicator '!'.

Figure 4:
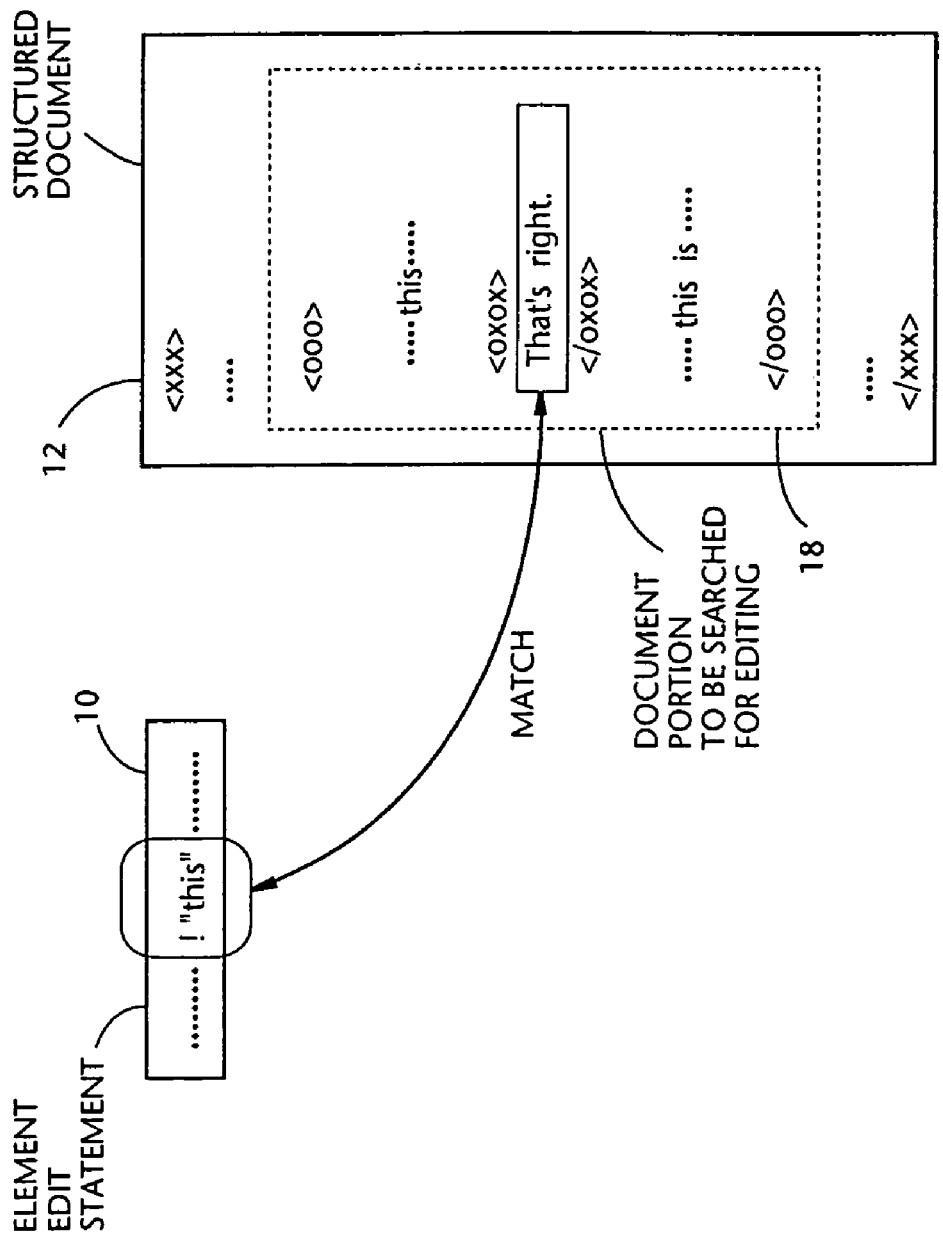

The negation indicator is defined by the '!' character (exclamation character). The negation indicator is used to specify an element wherein a match is not established with a character sequence immediately following the negation indicator. FIG. 4 is a diagram schematically showing one example of matching of a character sequence "this" preceded by the negation indictor with an element in a document portion 18 of the structured document 12. The character sequence "this" is defined in the element edit statement 10.

Figure 5:
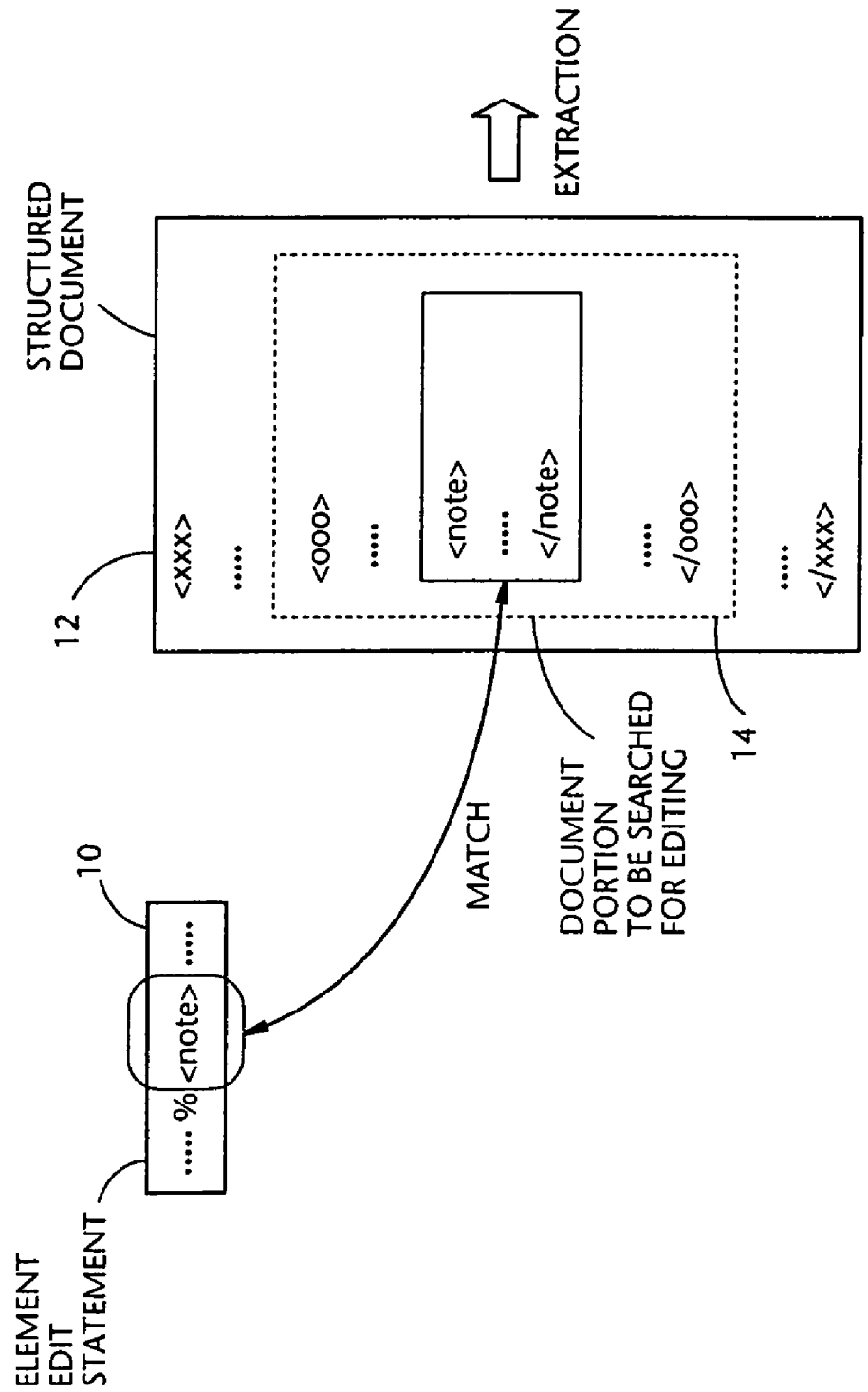

(e) Extraction Indicator '%':

The extraction indicator is defined using the '%' character, and is used to extract an element from the structured document, which element matches an element designated by a tag which follows the extraction indicator '%'. One example of the usage of the extraction indicator '%' is described with reference to FIG. 5. As shown in FIG. 5, the element edit statement 10 contains a tag <note> which is preceded by the extraction indicator '%'. The structured document 12 involves the document portion 14 that is currently to be searched. In this case, the element including tags <note> and </note> is specified and then extracted.

Figure 6:
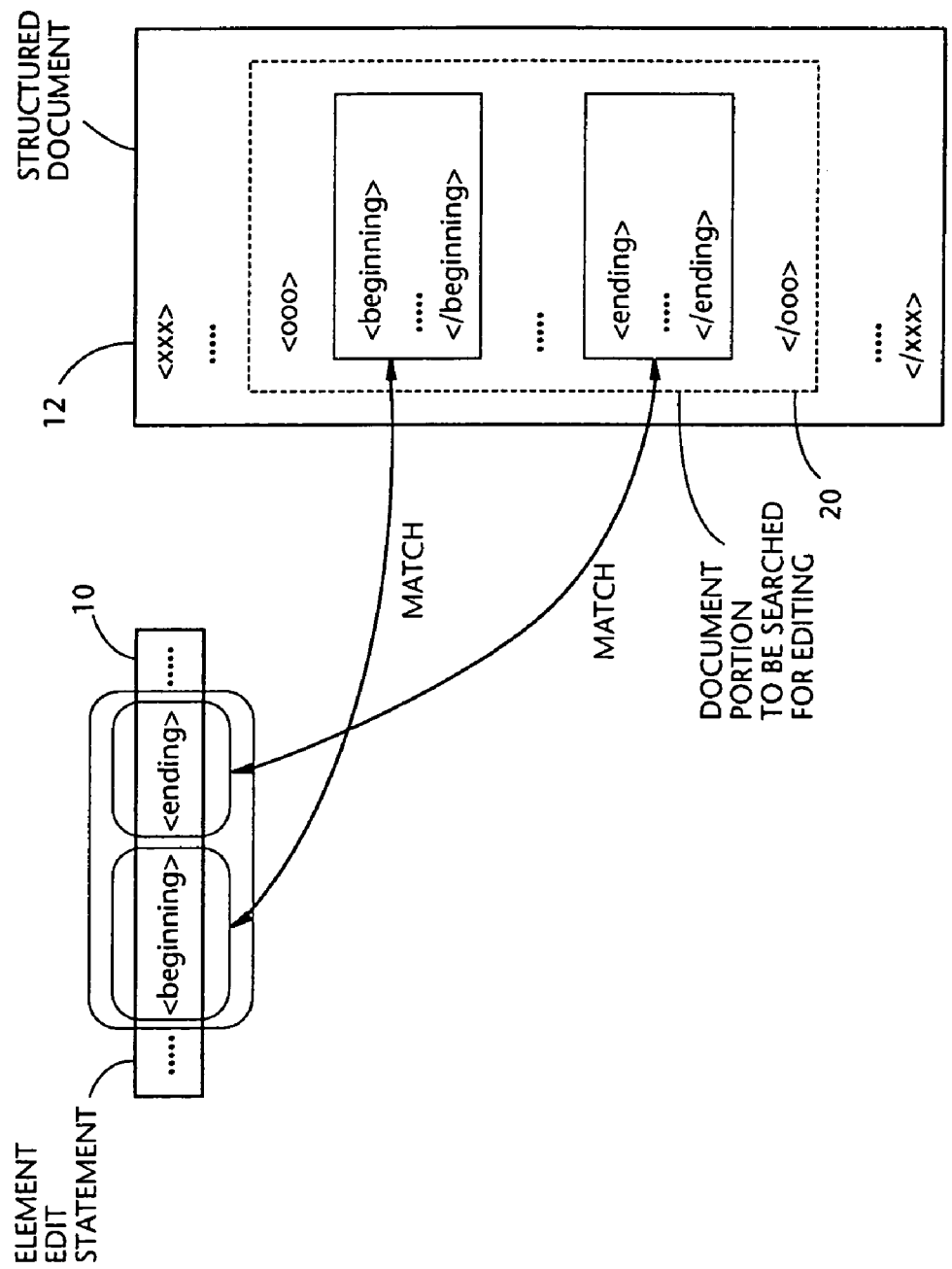

(f) Sequence Connector ',':

The sequence connector is defined by the ',' (comma) character. Considering the example of <A>, <B>, in the case of which the element specified by tag A must precede the element specified by tag B. However, a match is also established even if another element exists between the elements respectively defined tags A and B. One example of the sequence connector ',' is shown in FIG. 6. As shown, the element edit statement 10 contains the sequence connector ',' between tags <beginning> and <ending>. The structured document 12 involves a document portion 20 which contains the elements "beginning" and "ending" in this order. As a result, matches are established as illustrated.

Figure 7:
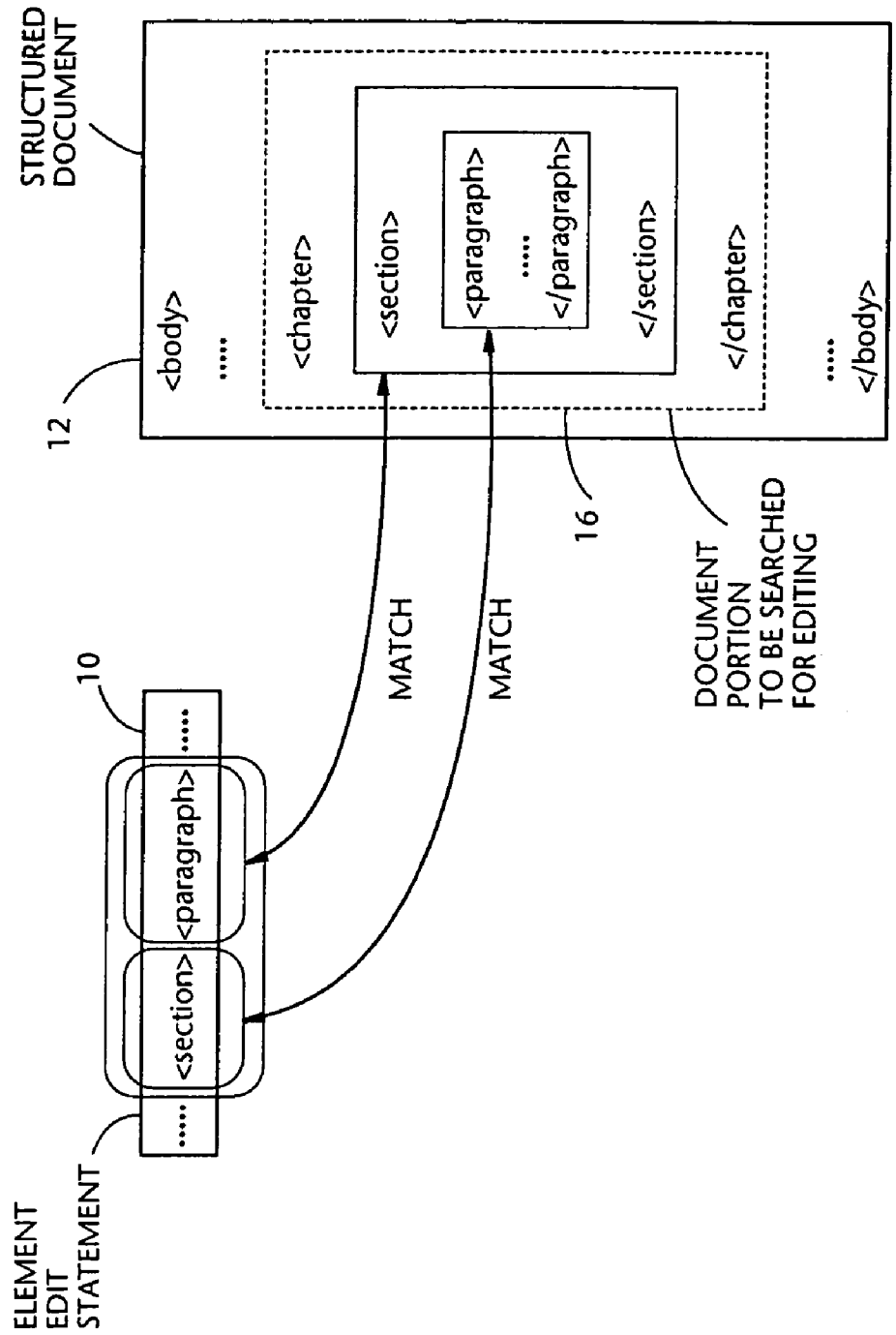

(g) Hierarchy Connector:

The hierarchy connector is defined by inserting no character between adjacent tags. A match is established only if the element (defined by the first tag and denoted by C) preceding the hierarchy connector contains the element (defined by the second tag and denoted by D) following the hierarchy connector in the document portion to be searched. It is to be noted that a match is also established even if there exists another element between the elements C and D. One example of usage of the hierarchy connector is described with references to FIG. 7. As shown in FIG. 7, the element edit statement 10 contains the hierarchy connector between two tags <section> and <paragraph>. The structured document 12 involves a document portion 16 which is currently to be searched for and contains the hierarchical data structures <chapter>, <section> and <paragraph>. In this case, the element <section> contains the element <paragraph> and thus, a successful match is established as illustrated.

(b) Parentheses:

The parentheses '(' and ')' indicate that the element(s) within the parentheses is preferentially processed.

Figure 8:
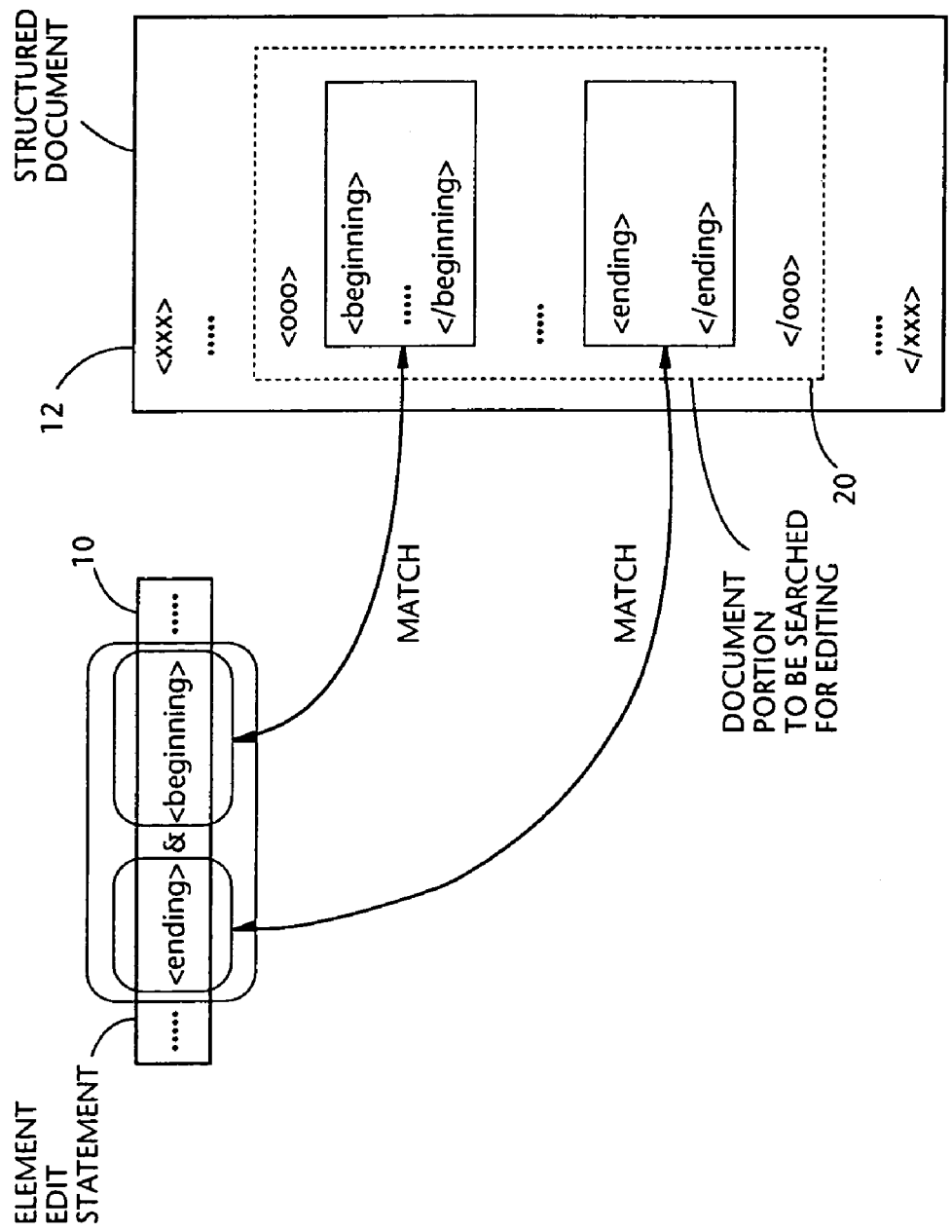

(i) AND Connector '&':

The AND connector is defined using the '&' character. The example ( E & F) indicates that 'F' may either follow or precede 'E' in the document portion to be searched for editing. Referring to FIG. 8, one example of usage of the AND connector is shown. As shown, the element edit statement 10 contains the AND connector '&' sandwiched by two tags <beginning> and <ending>. The structured document 12 contains the elements, defined by the tags <beginning> and <ending>, in the document portion 20 and thus, a successful match is established as illustrated.

Figure 9:
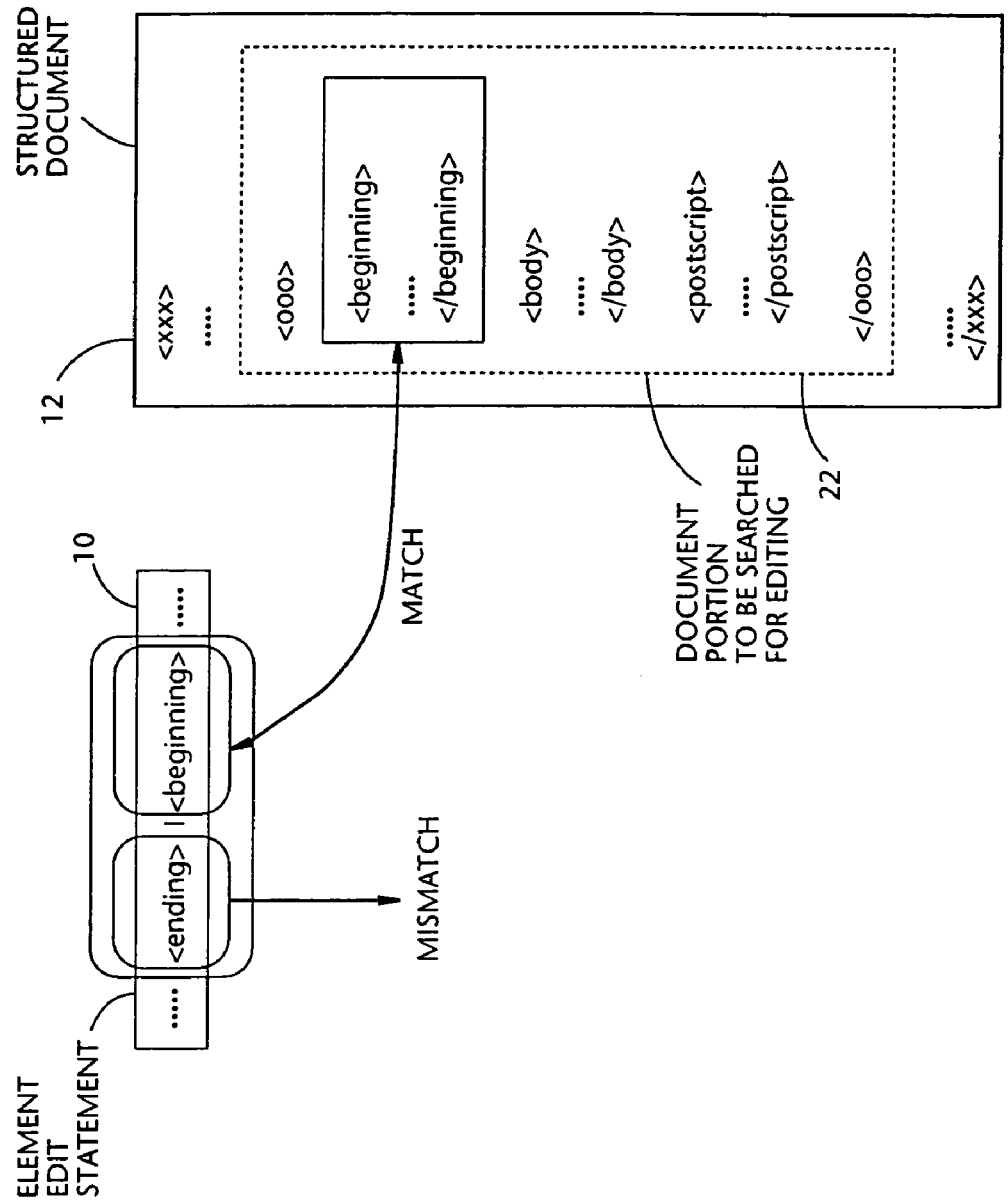

(j) OR Connector '|':

The OR connector is defined by the '|' character. The example (G |H) indicates that 'G' may be present or 'H' may be present in the document portion to be searched for editing. The OR connector (|) is further described with reference to FIG. 9. As shown, the element edit statement 10 contains the OR connector sandwiched by two tags <beginning> and <ending>. The structured document 12 contains only the element <beginning> in the document portion 22 and thus, one successful match is established as illustrated.

Figure 10:
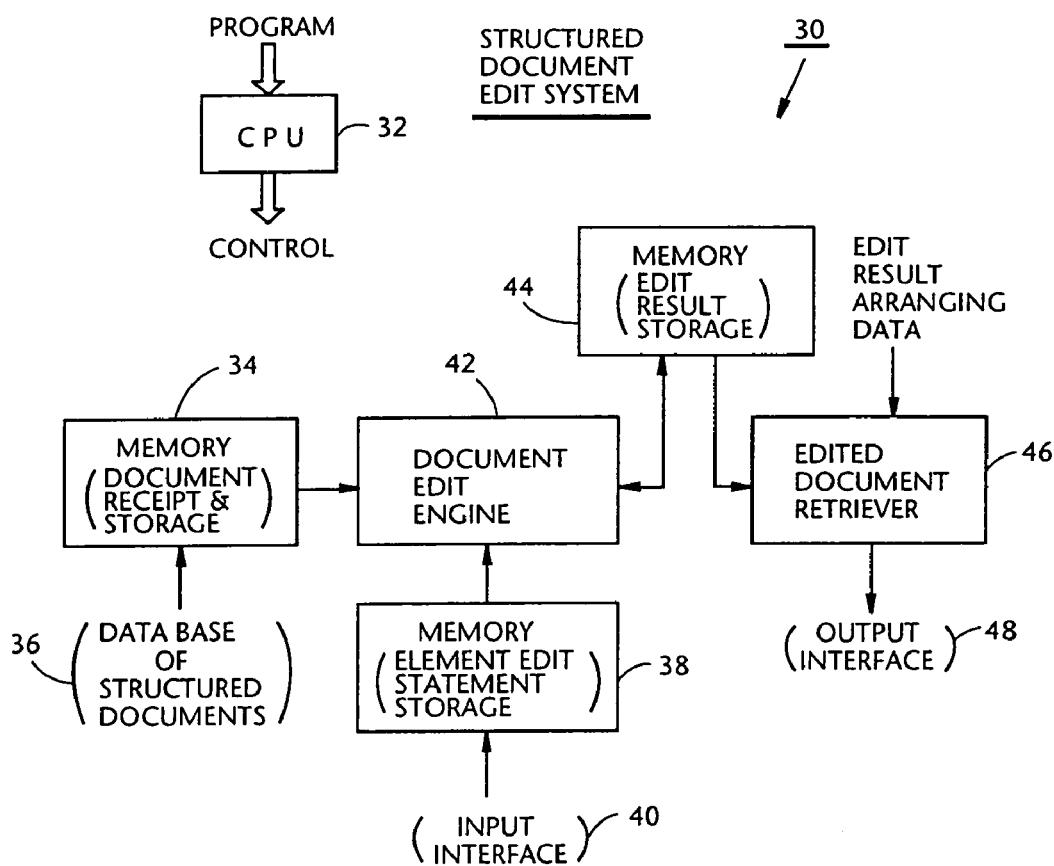
FIG. 10 is a diagram showing a document edit system used in a first preferred embodiment of the present invention.

Referring to FIG. 10, there is shown a structured document edit system 30 of a first embodiment of the present invention in block diagram form.

As shown in FIG. 10, a controller 32, which typically takes the form of central processing unit (CPU), is provided to control the overall operation of the system 30. A memory 34 is arranged so as to receive a plurality of documents, on a one-by-one basis (usually), from a data base 36 which has stored a plurality of structured documents. A memory 38 is provided for storing one or more element edit statements. Typically, one statement is applied to the memory 38 via a suitable input interface 40.

A document edit engine 42 accesses the memories 34 and 38, and edits the document stored in the memory 42 using the element statement, and applies the edit results (in sequence or in batch) to a memory 44 to store the same therein. The edit result is adaptively outputted using a document retriever 46 and an appropriate output interface 48. In this case, the edit result may be arranged using an edit result arranging data applied to the edited document retriever 46.

A first example of the first embodiment will be described with reference to FIGS. 11–17.

Figure 11:
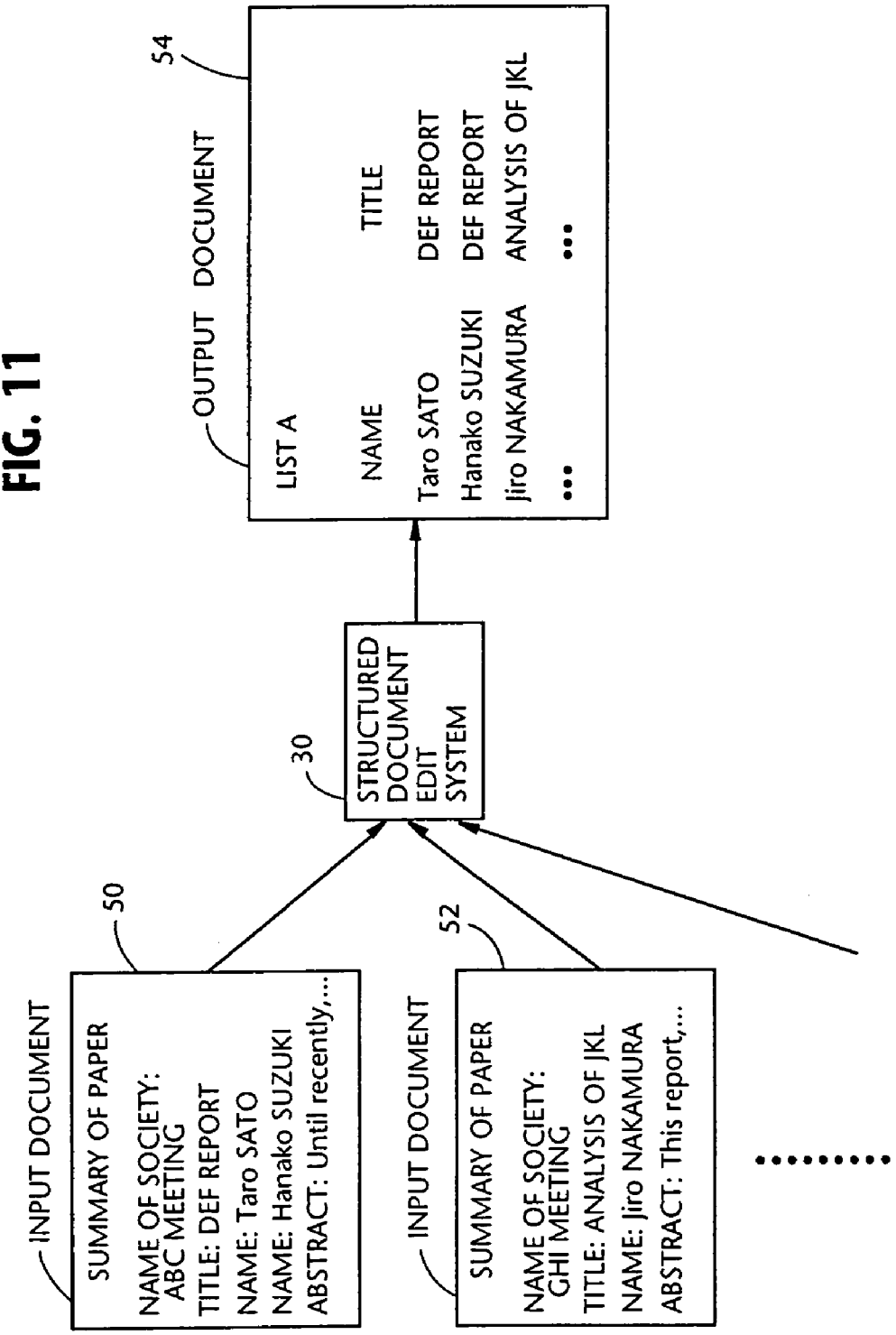
FIG. 11 is a diagram showing input and output documents together with the functional block of the system of FIG. 10.

FIG. 11 is a diagram which shows a plurality of input documents (only two documents 50 and 52 are shown), an output document 54, and the document edit system 30 (FIG. 10). The output document 54 is a list showing the edit result after being subject to listing order arrangement. The first example of the first embodiment is to edit a plurality of input documents, including the input documents 50 and 52, so as to, in this particular case, extract the names of paper's authors and corresponding paper's titles, after which the edit (extracting) results are listed.

As shown, the input document 50 contains the following items.

\# Summary of paper
\# Name of Society: ABC Meeting
\# Title: DEF Report
\# Name: Taro SATO
\# Name: Hanako SUZUKI
\# Abstract: Until recently.

On the other hand, the input document 52 contains the following items.

\# Summary of paper
\# Name of Society: GHI Meeting
\# Title: Analysis of JKL
\# Name: Jiro NAKAMURA
\# Abstract: This report, . . .

The output document 54 contains the following items which are results of document editing carried out by the edit system 30.

| # List A | | |
|---|---|---|
| # | Name | Title |
| | Taro SATO | DEF report |
| | Hanako SUZUKI | DEF report |
| | Jiro NAKAMURA | Analysis of JKL |
| | . . . | . . . |

Figure 12:
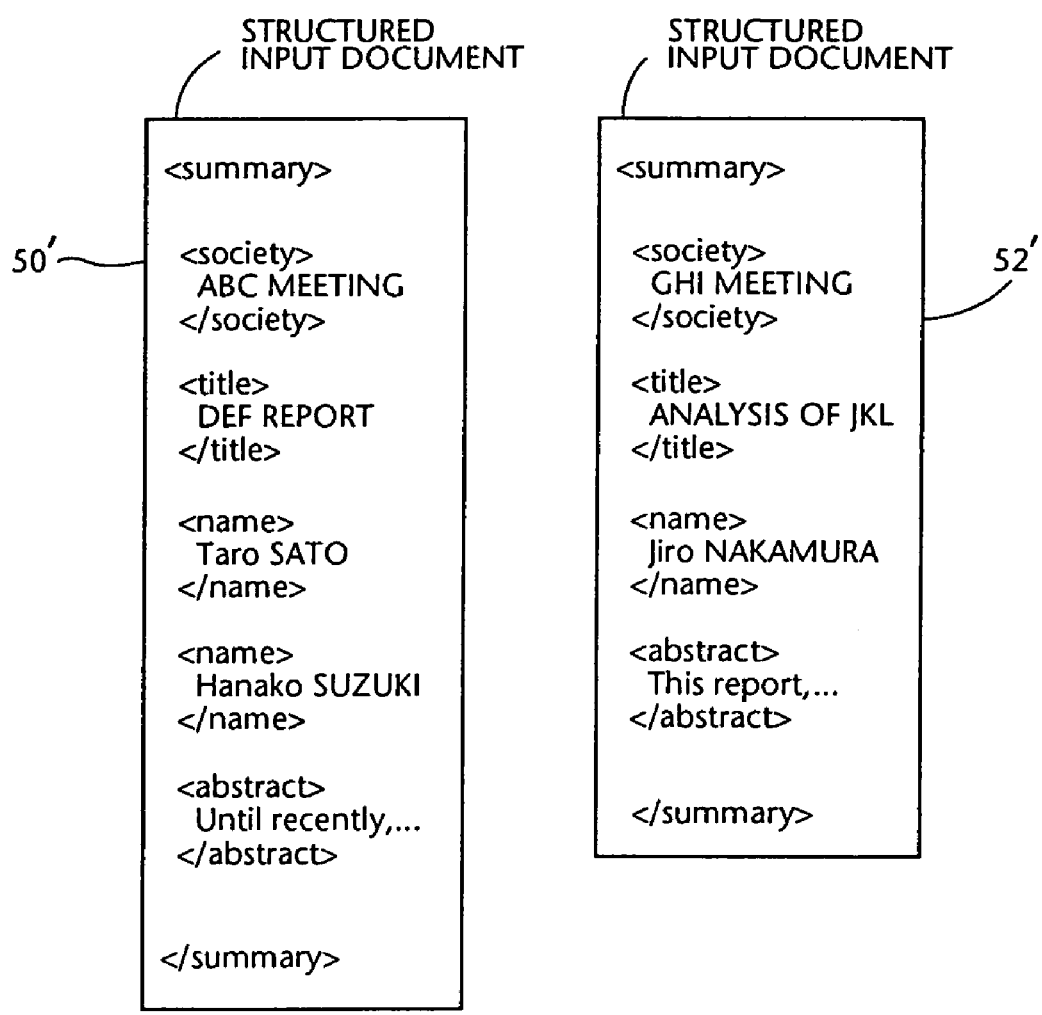
FIG. 12 is a diagram showing two structured documents that respectively correspond to the input documents of FIG. 11.

FIG. 12 shows the structured input documents 50' and 52' that respectively correspond to the input documents 50 and 52, while FIG. 13 shows the structured document 54' that corresponds to the output document 54. It is understood that the content of each of the items ("SUMMARY OF PAPER", "NAME OF SOCIETY", etc.) is defined using a start-tag defined by '<' and an end-tag defined by '</' and '>'. The detailed description of FIGS. 12 and 13 are deemed redundant and accordingly, will be omitted for brevity.

The operation of editing the input documents 50 and 52 and generating the output document 54, will be described using FIGS. 14–17 together with FIGS. 10–13.

Figure 14:
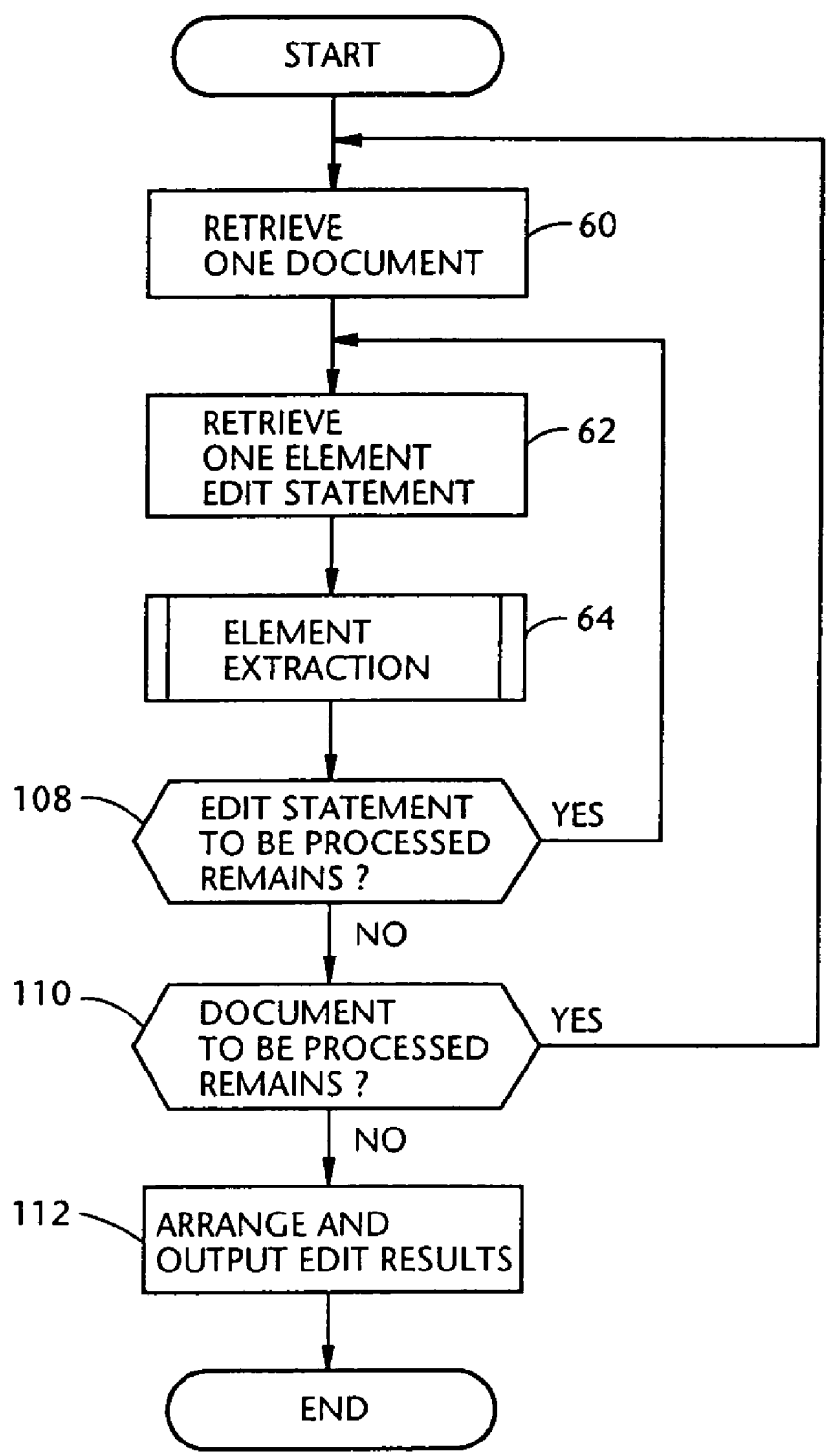
FIGS. 14 to 17 are each flow chart which includes the steps which characterize the operation of one example of the first embodiment.

FIG. 14 is a flow chart which shows the steps which characterize the overall operation of the document data editing according to the first embodiment. In FIG. 14, at step 60, the first input document 50 is applied to the memory 34 from the database 36.

Assuming that an element edit statement is:

%<title>,%<name>. . . element edit statement A which is referred to as the element edit statement A for the sake of simplifying the discussion. At step 62, the element edit statement A is written into the document edit engine 42, after which the routine proceeds to a sub-routine 64 for element extraction. The sub-routine 64 is shown in FIG. 15 in detail.

Figure 15:
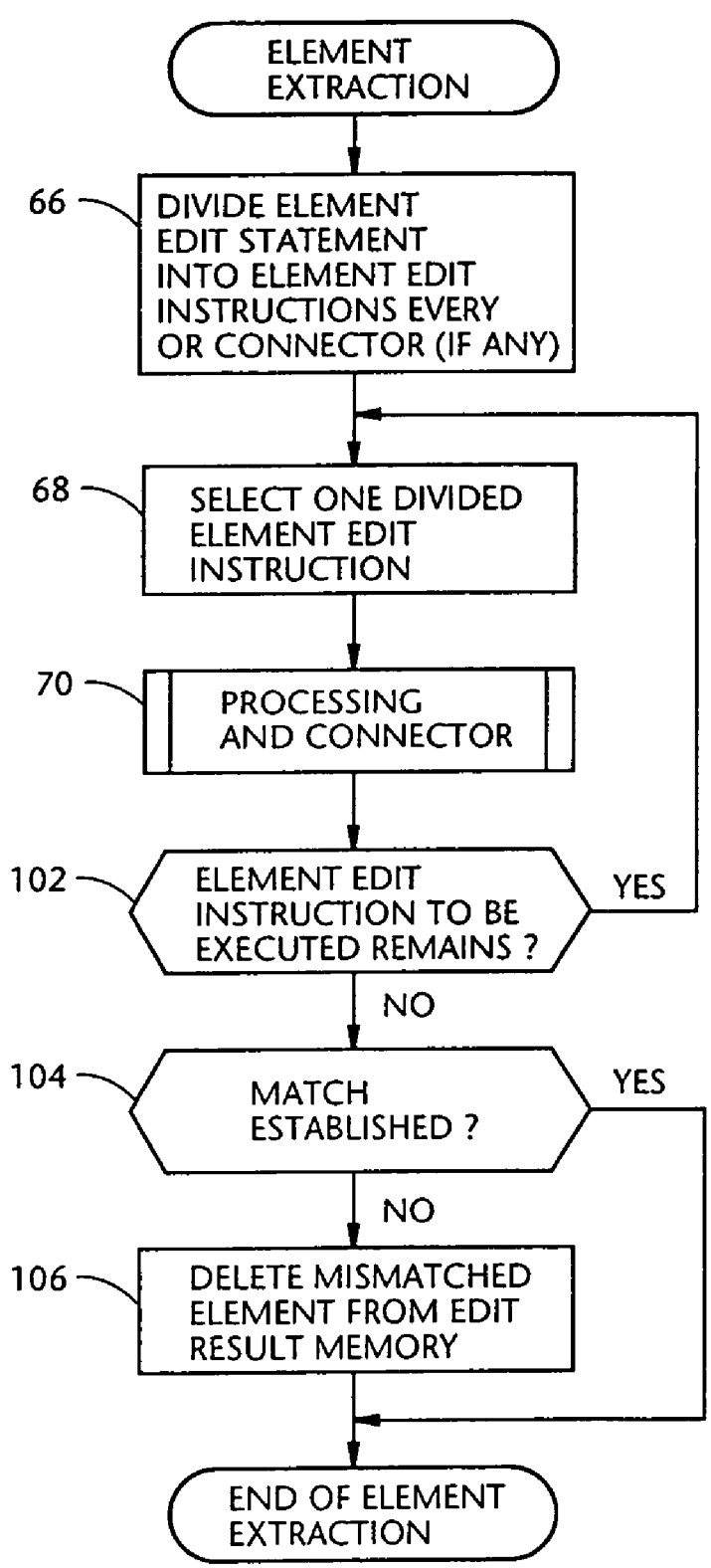

Referring to FIG. 15, at step 66, if the element edit statement, retrieved into the document edit engine 42, contains one or more than one "OR" connectors", the element edit statement is divided into a plurality of element edit instructions (operators), such as %<title> and %<name>, in every "OR connector". However, in the instant case, there exists no "OR connector" in the element edit statement A and thus, the step 66 is not executed. At step 68, one of the element edit instructions divided at step 66 is selected. However, as mentioned above, no division of the statement is carried out at step 66 and thus, the element edit statement A is selected as a whole, after which the routine goes to a sub-routine 70, the details of which is shown in FIG. 16.

Figure 16:
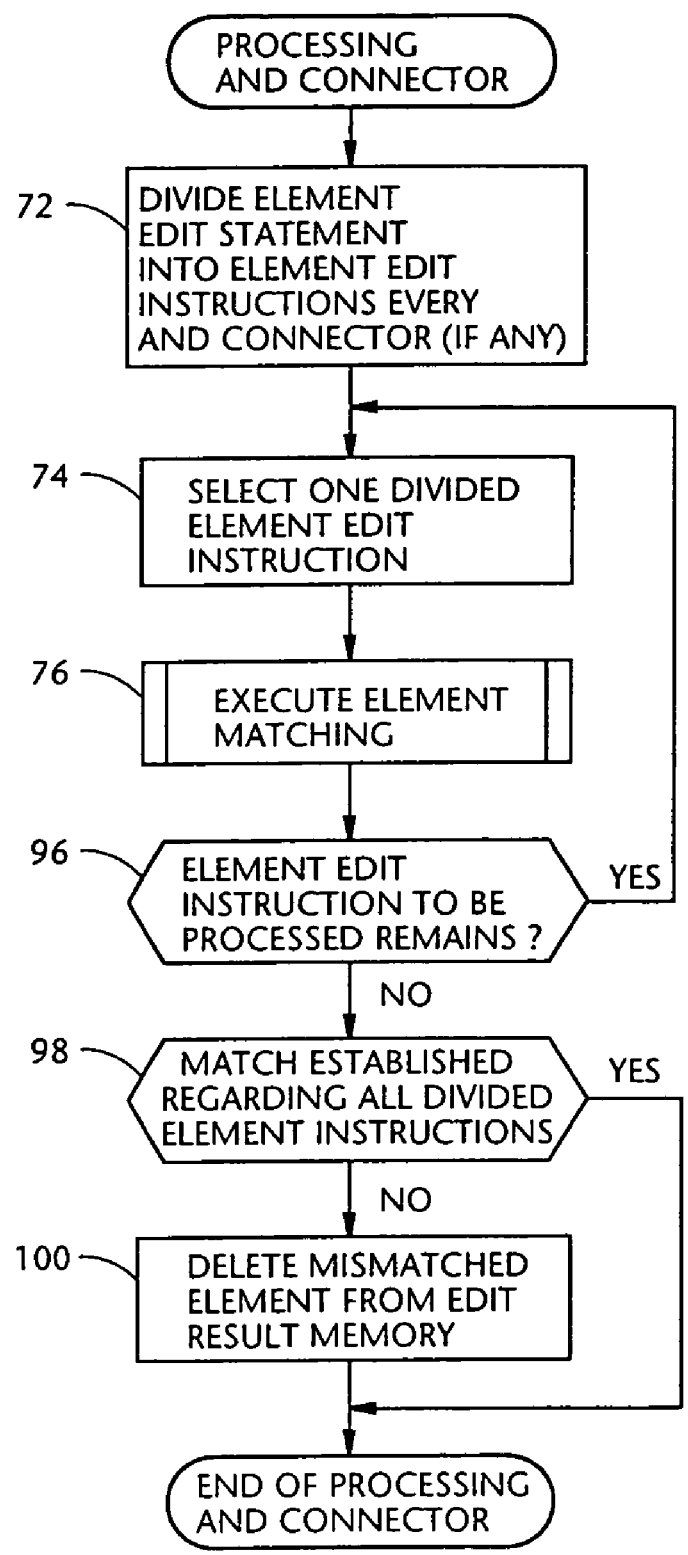

Referring to FIG. 16, at step 72, the element edit statement containing "AND connector (&)" is processed. Although no "AND connector" is contained in the element edit statement A, the flow chart of FIG. 16 is described in another example, set forth later, which includes the "AND connector". At step 72, if the element edit statement, applied to the document edit engine 42 (FIG. 10), contains one or more "AND connectors", the statement is divided into a plurality of element edit instructions or tags every each "AND connector". However, in the instant case, no "AND connector" is contained in the element edit statement A and thus, the step 72 is not executed. At step 74, one of the element edit instructions or tags, divided at step 72 is selected. However, as mentioned above, no division of the statement is carried out at step 72 and thus, the element edit statement A is selected as a whole, after which the program goes to a sub-routine 76, the details of which is shown in FIG. 17.

Figure 17:
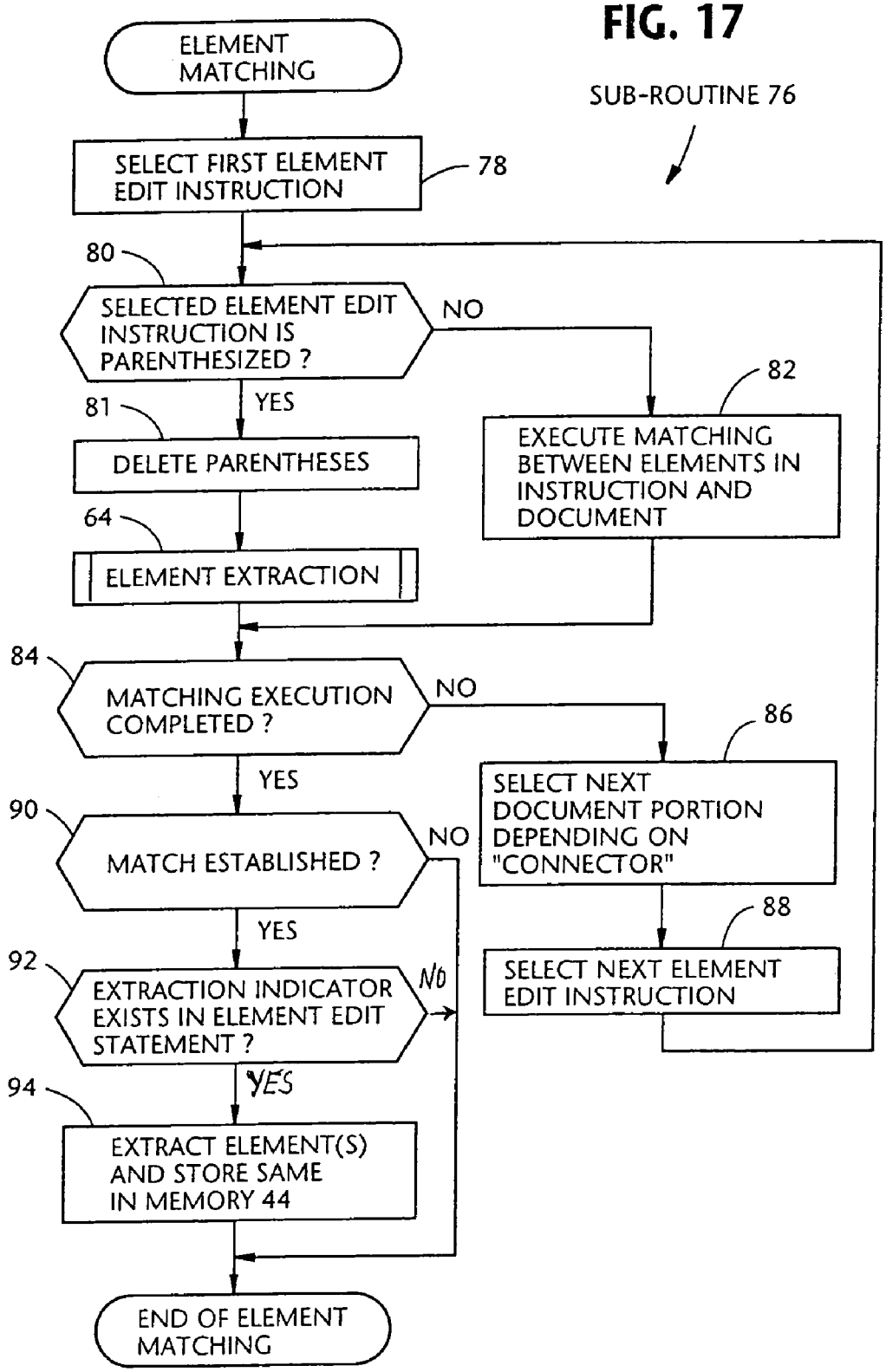

In FIG. 17, at step 78, the first element edit instruction (or tag) of the element edit statement A is selected for execution. Following this, the program proceeds to step 80 at which a check is made to determine if the edit instruction (or tag) selected at step 78 (viz., <title> in the instant case) is parenthesized. The element edit tag <title> is not parenthesized and thus, the routine goes to step 82 at which the tag <title> is processed to determine if the element "title" matches any element of the structured document 50'. In the instant case, a match is established with the following element in the structured document 50':

<title>
DEF Report
</title>

Subsequently, at step 84, a check is made to determine if the matching execution has completed. In this case, since the answer to the inquiry made at step 84 is negative, the routine proceeds to step 86. The element edit statement contains the sequence connector ',' and hence, at step 86, the document portion following the element which has matched at step 82, becomes the next document portion to be searched. Following this, at step 88, the next element edit instruction (tag) (viz., <name>) is selected and the routine goes back to step 80. Thus, the following elements in the structured document 50' are matched:

<name>
Taro SATO </name>and
<name>
Hanako SUZUKI
</name>

Since the matching execution in connection with the document 50' completed, the answer to the inquiry made at step 84 is positive. Thus, the routine goes to step 90 at which a check is made to determine if any match has been established. In this case, the matches are established as mentioned above, the routine proceeds to step 92 at which a check is further made to determine if the extraction indicator '%' exists in the statement A. At step 94, since the extraction indicator '%' is involved in the element edit statement A, the matched elements are extracted and stored in the memory 44. Thereafter, the routine goes to step 96 of FIG. 16. In the above, if the answer at step 80 is positive, the parentheses are deleted at step 81 and the routine jumps to the sub-routine 64 (FIG. 14).

After executing step 94 (FIG. 17), the routine goes to step 96 at which a check is made to determine if all the element edit instructions (or tags), divided at step 72, have been processed. In the instant example, the element edit statement A does not involve any AND connector and hence, steps 96, 98, and 100 are not executed and the routine goes to step 102 (FIG. 15). In the instant example, the element edit statement A does not involves any OR connector and hence steps 102, 104 and 106 (FIG. 15) are not executed.

Subsequently, the routine goes to 108 (FIG. 14) at which a check is made to determine if the element edit statement to be processed remains. Since no element edit statement to be processed with respect to the document 50' remains, the routine goes to step 110. The document 52' has not yet been processed and hence, the routine goes back to step 60 at which the next document 52' is inputted to memory 34, after which the above mentioned processing is carried out in the same manner. The processing of the document 52' is clear from the foregoing, the description thereof will be omitted for brevity. It is understood that the element extracted from the document 52' is:

<title>
ANALYSIS OF JKL
</title>and
<name>

All the elements thus extracted are stored in the memory 44 as the edit result. Thereafter, the edit result is retrieved by the edited document retriever 46, which arranges and add data (or name(s)) if the edit result arranging data is applied thereto. In the instant example, the name "LIST A" is added to the top and, the names of the authors are listed at the left side of the list. Subsequently, the document named "LIST A" is outputted from the system 30. The above operations are implemented at step 112.

A second example of the first embodiment will be described. This example extracts the items of "name of society" and "title" from the documents 50 and 52, and outputs the edited document as a list B which is shown below.

| LIST B | |
|---|---|
| NAME OF SOCIETY | TITLE |
| ABC MEETING | EDF REPORT |
| CHI MEETING | ANALYSIS OF JKL |
| In this example, the element edit statement is: | |
| %<society>&%<title> | . . . element edit statement B |

As shown, the above statement is referred to as "element edit statement B" for the sake of convenience of description. This example features that the elements redefined by the tags in the statement B are indepently matched and then extracted. Consequently, even if the items in the input documents 50 and 52 are differently arranged, the element extraction can be implemented without difficulty.

In the second example, the tags <society> and <title> are divided at step 72 (FIG. 16) and then the matching of the elements, defined by the tags <society> and <title>, in each of the documents 50' and 52' are able to be carried out independently. The extracted items (elements) are arranged, using the edit result arranging data applied to the edited document retriever 46 (FIG. 10), so as to meet the requirement shown above. Further, the name "LIST B" can be added to the output document using the aforesaid edit result arranging data.

A third example of the first embodiment will be described, which includes OR connector. An input document, indicated as a structured document, is shown in FIG. 18 and denoted by numeral 120. As shown in FIG. 18, an outermost element is a paper element which contains a first-p (first paragraph) element and a second-p (second paragraph). Further, the first-p element contains a figure element, and similarly, the second-p contains a figure element. The third element is to extract the figure element from each of the first-p and second-p. Thus, the element edit statement in the third example is:

(<first-p>|<second-p>)%<figure> . . . element edit statement C As shown, this statement is referred to as "element edit statement C" for the sake of convenience of description. It is to be noted that (<first-p>|<second-p>) and %<figure> are connected by the hierarchy connector since no character is provided therebetween. The third example contains OR connector and thus, the tags within the parentheses are divided at step 66 (FIG. 15), after which these tags are separated and are subject to the element matching process on an element-by-element basis. As mentioned above, since the hierarchy connection is used, the element <figure> of each of the elements <first-p> and <second-p> is extracted.

A second embodiment of the present invention will be described with reference to FIGS. 19–28.

Figure 19:
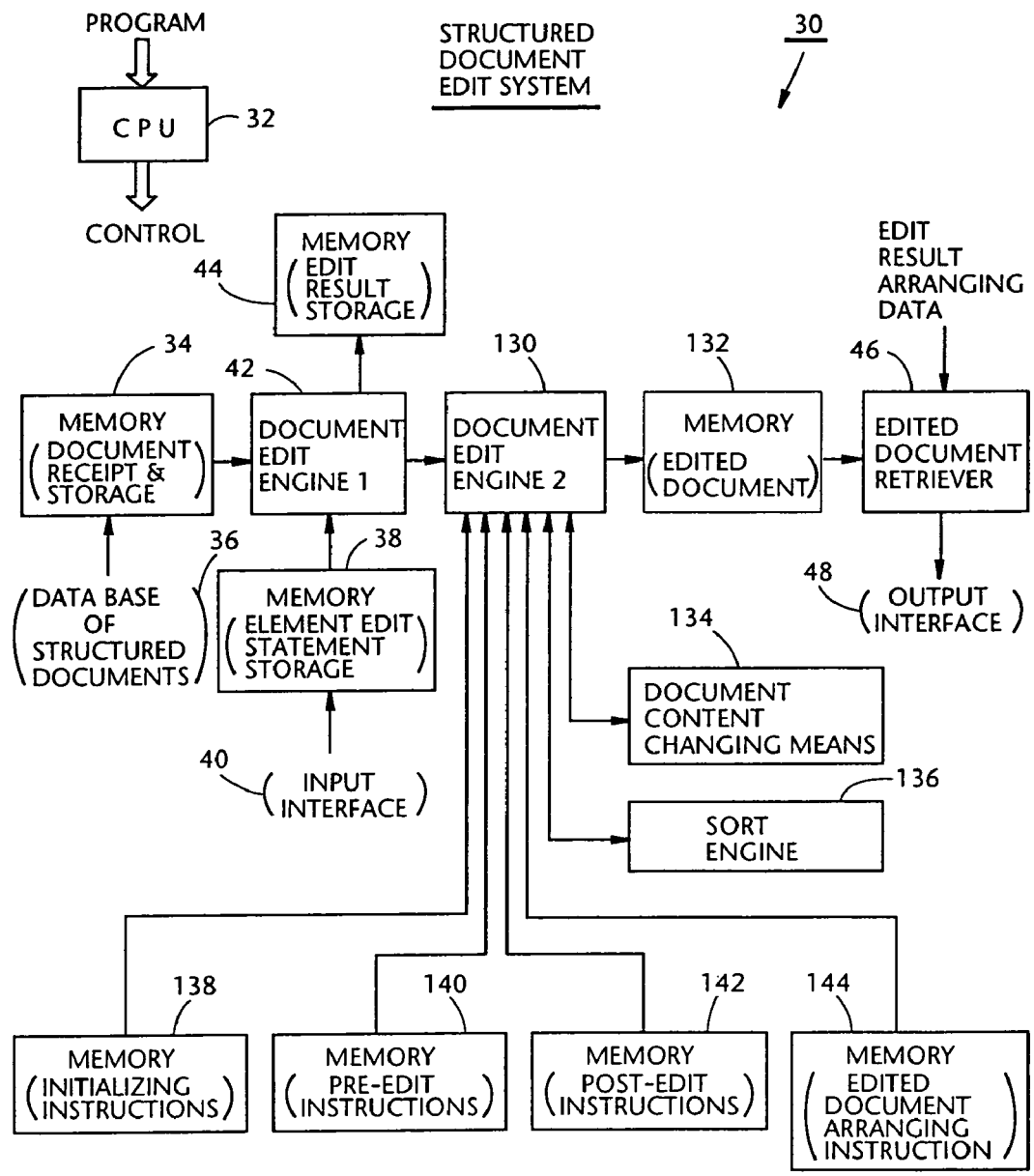
FIG. 19 shows a diagram showing a document edit system used in a second preferred embodiment of the present invention.

Referring to FIG. 19, there is shown a structured document edit system denoted by 30' which, in addition to the arrangement shown in FIG. 10, comprises the following new blocks.

(1) block 130: document edit engine 2.
(2) block 132: memory for storing an edited document.
(3) block 134: document content changing means.
(4) block 136: sort engine.
(5) block 138: memory for storing one or more initializing instructions.
(6) block 140: memory for storing one or more pre-edit instructions.
(7) block 142: memory for storing one or more post-edit instructions.
(8) block 144: memory for storing one or more edited document arranging instruction(s).

In order to differentiate the block 42 from the block 130, the block 42 is indicated by the document edit engine 1.

Figure 20:
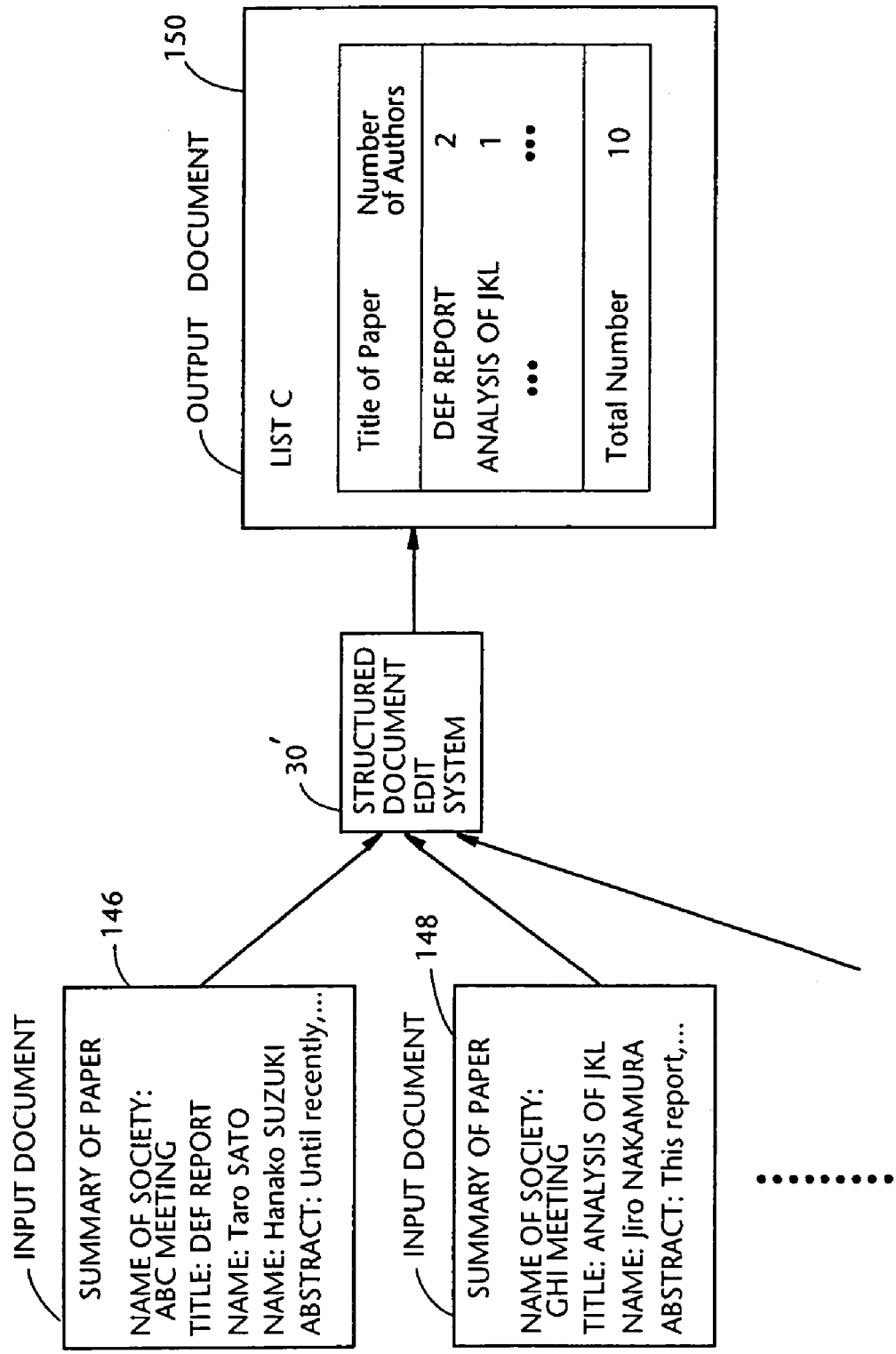
FIG. 20 is a diagram showing input and output documents together with the functional block of the system of FIG. 19.

FIG. 20 shows two input documents 146 and 148, the edit system 30' of FIG. 19, and an output document 15. The input documents 146 and 148 are respectively identical with the documents 50 and 52 of FIG. 11, and thus, the further descriptions thereof will be deemed redundant and accordingly omitted for simplifying the instant disclosure. The output document 150 is a list C which includes the title of the paper and the number of authors, which are extracted from the documents 146 and 148. Further, the total number of the authors are calculated and listed. Still further, the name "title" in each of the input documents 146 and 148 is changed to "Title of Paper" in the list C, while the names "Number of Authors" and "Total Number" are added in the list C.

FIG. 21 shows a structured output document 150' which corresponds to the output document 150 of FIG. 20.

In order to generate the list C shown in FIG. 20, element edit statements D-1 and D-2 are inputted to the memory 38. More specifically, The element edit statement D-1 contains:

(1) Edit statement 1 which is %<title> for extracting the element <title>;

(2) Edit statement 2 for changing the name "title" to Title of Paper" and storing the changed name in a variable "title".

The element edit statement D-2 contains:

(1) Edit statement 3 which is %<name> for counting the number of authors;

(2) Edit statement 4 which counts the number of extracted names and stores the counted number in a variable "count".

Figure 22:
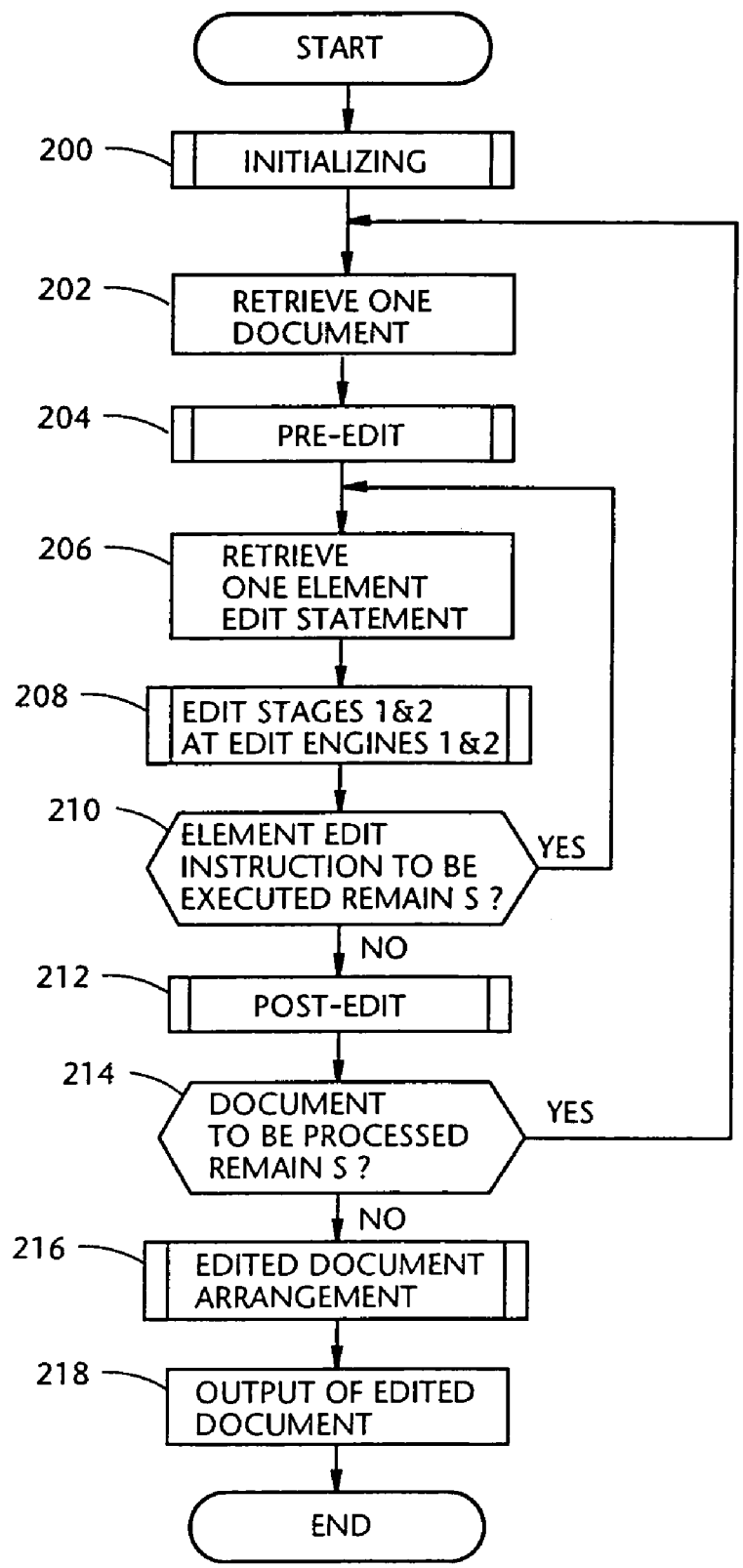
FIGS. 22 to 28 are each flow chart which includes the steps which characterize the operation of the second embodiment.
Figure 23:
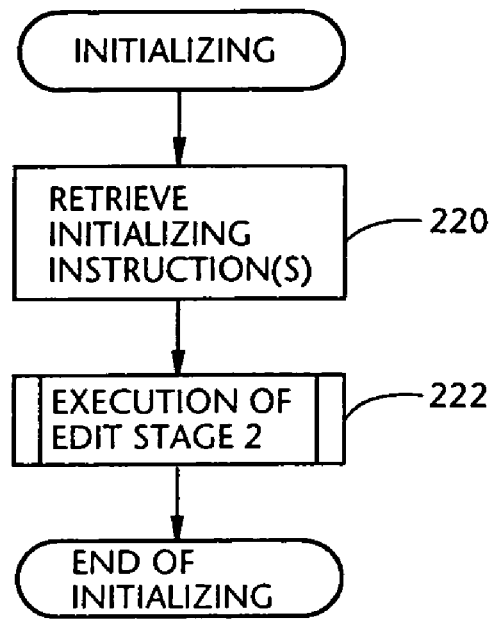
Figure 25:
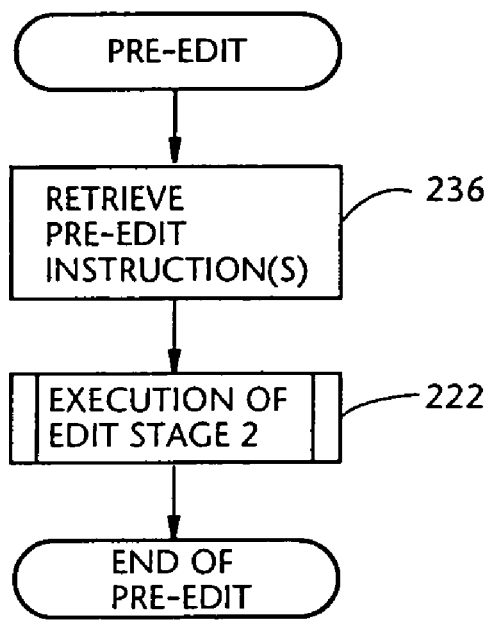
Figure 24:
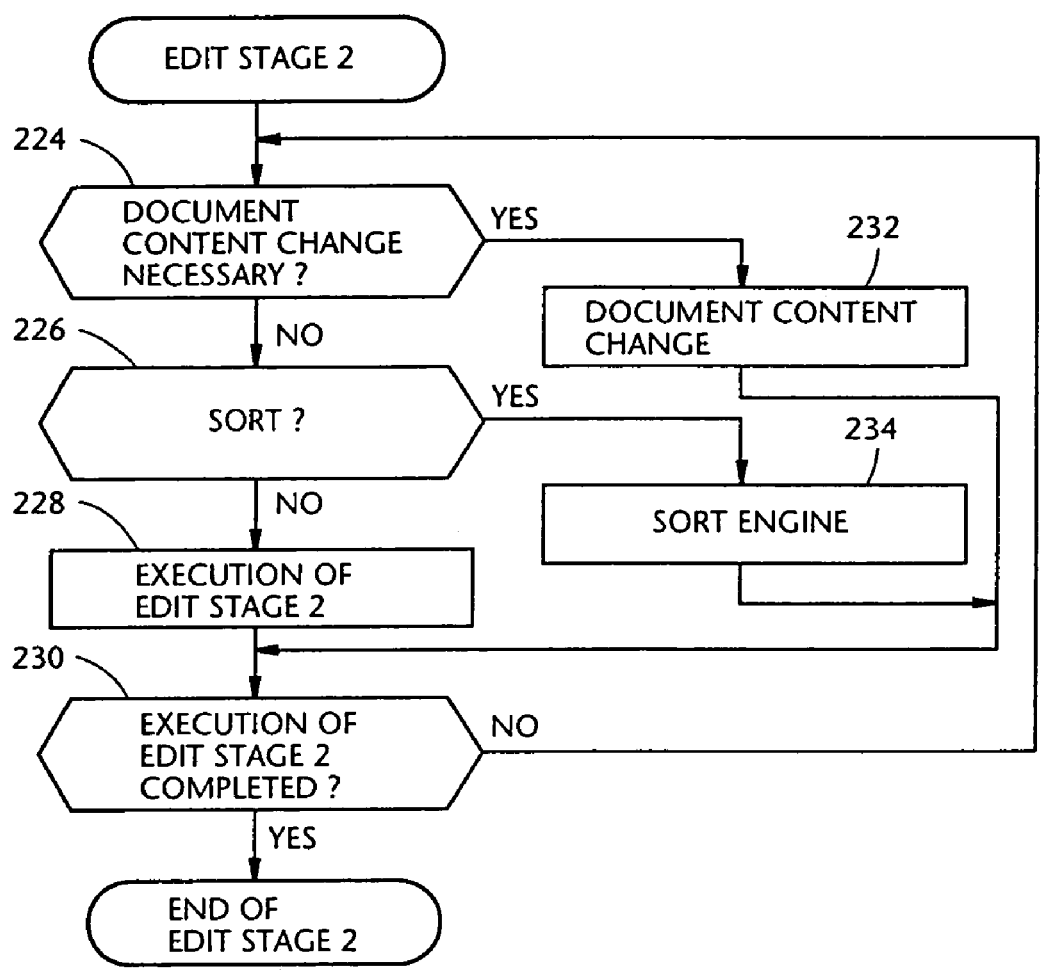
Figure 26:
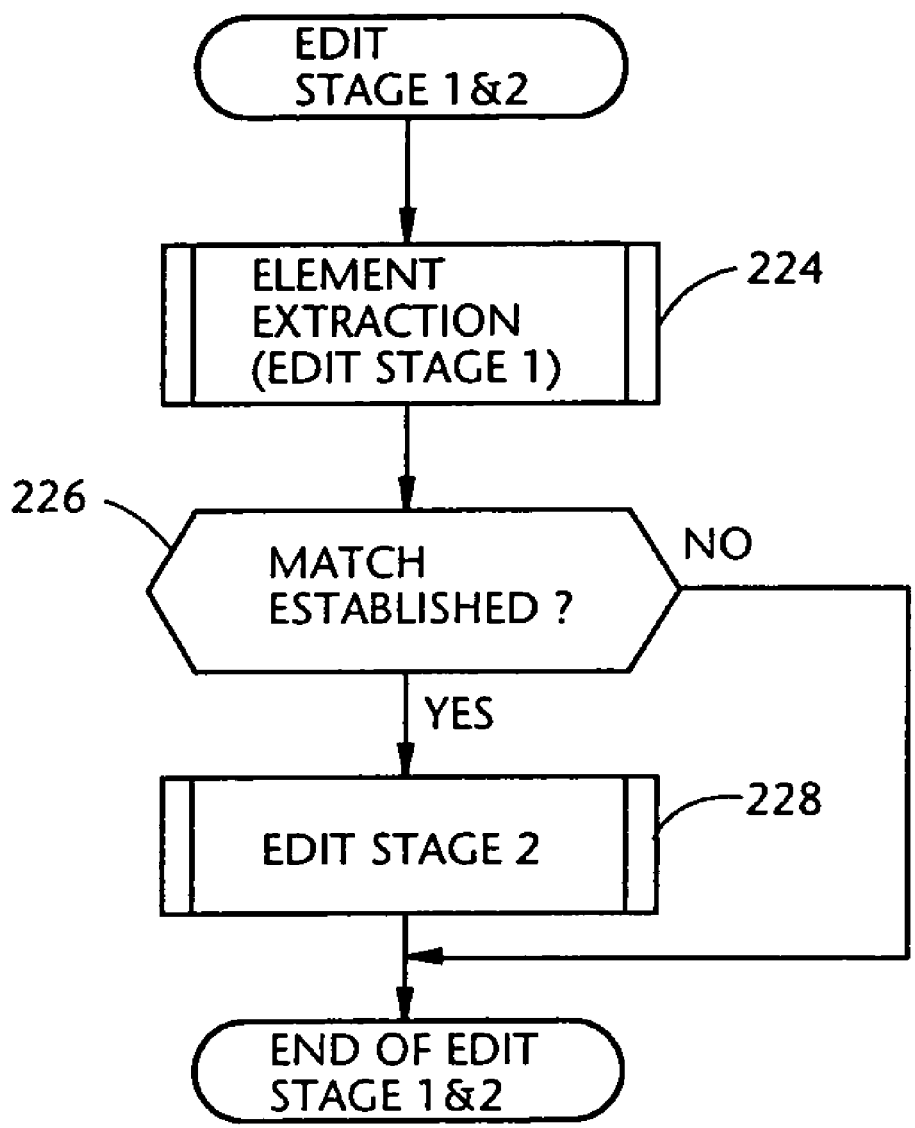
Figure 27:
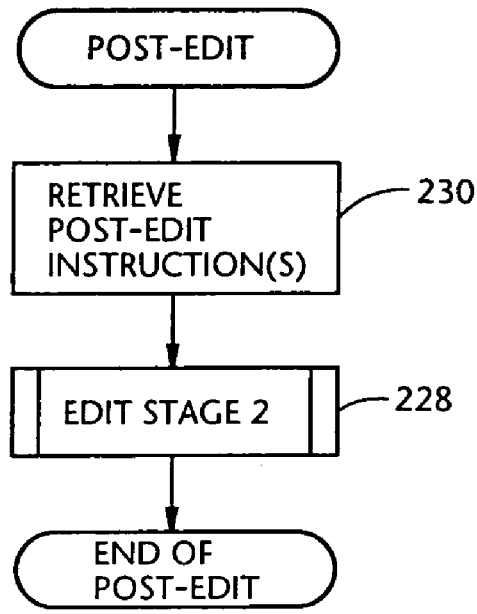
Figure 28:
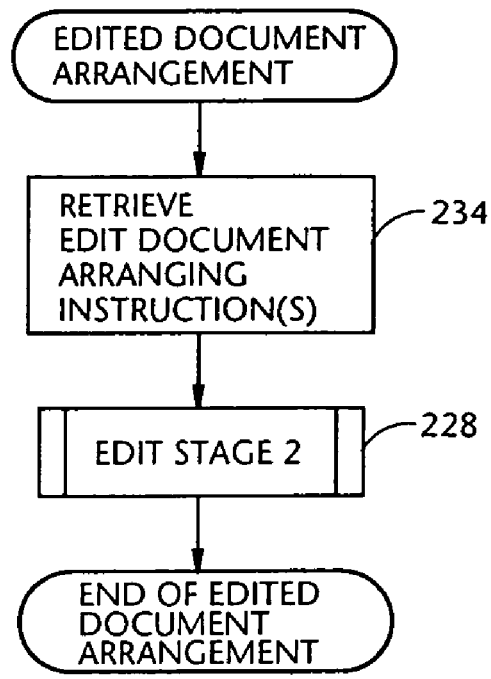
Figure 29:
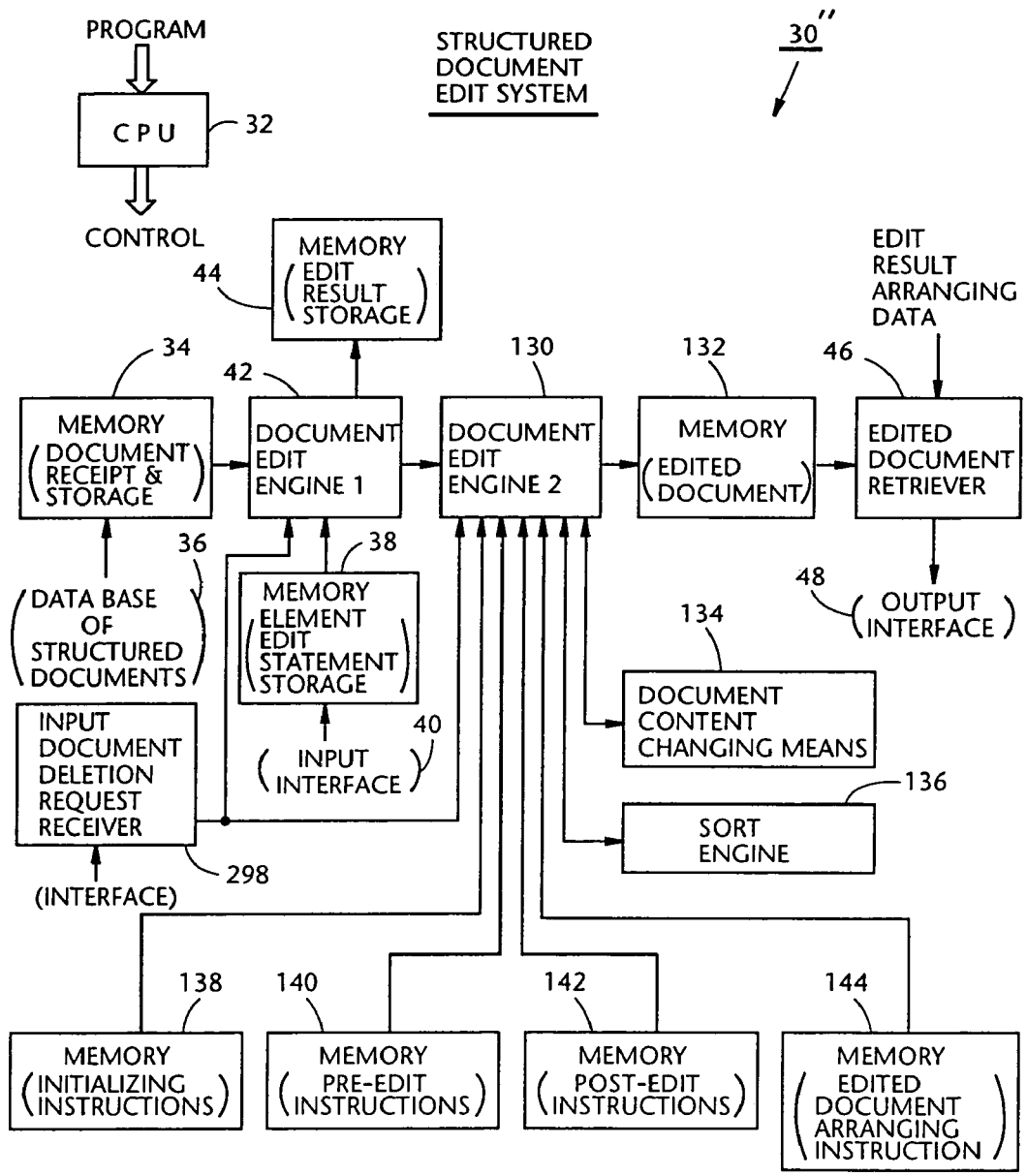
FIG. 29 shows a diagram showing a document edit system used in a third preferred embodiment of the present invention.

The operation of the second embodiment will be described with reference to FIGS. 19–28. In FIG. 22, an operation starts with a sub-routine 200 the detail of which is shown in FIG. 23. At step (viz., sub-routine 200), the initializing instructions, which are retrieved from the memory 138, includes two instructions, one of which is to reset a variable "total" which stores the total number of the authors and the other of which is to reset a variable "table" provided for arranging the edit result and generating the list C. At step 202, one input document is applied to the system 30', after which a pre-edit operation is implemented at step 204 (viz., sub-routine 204). Following this, a plurality of operations for generating the output document 150' are carried out at the following steps as shown in FIGS. 22–28.

Figure 30:
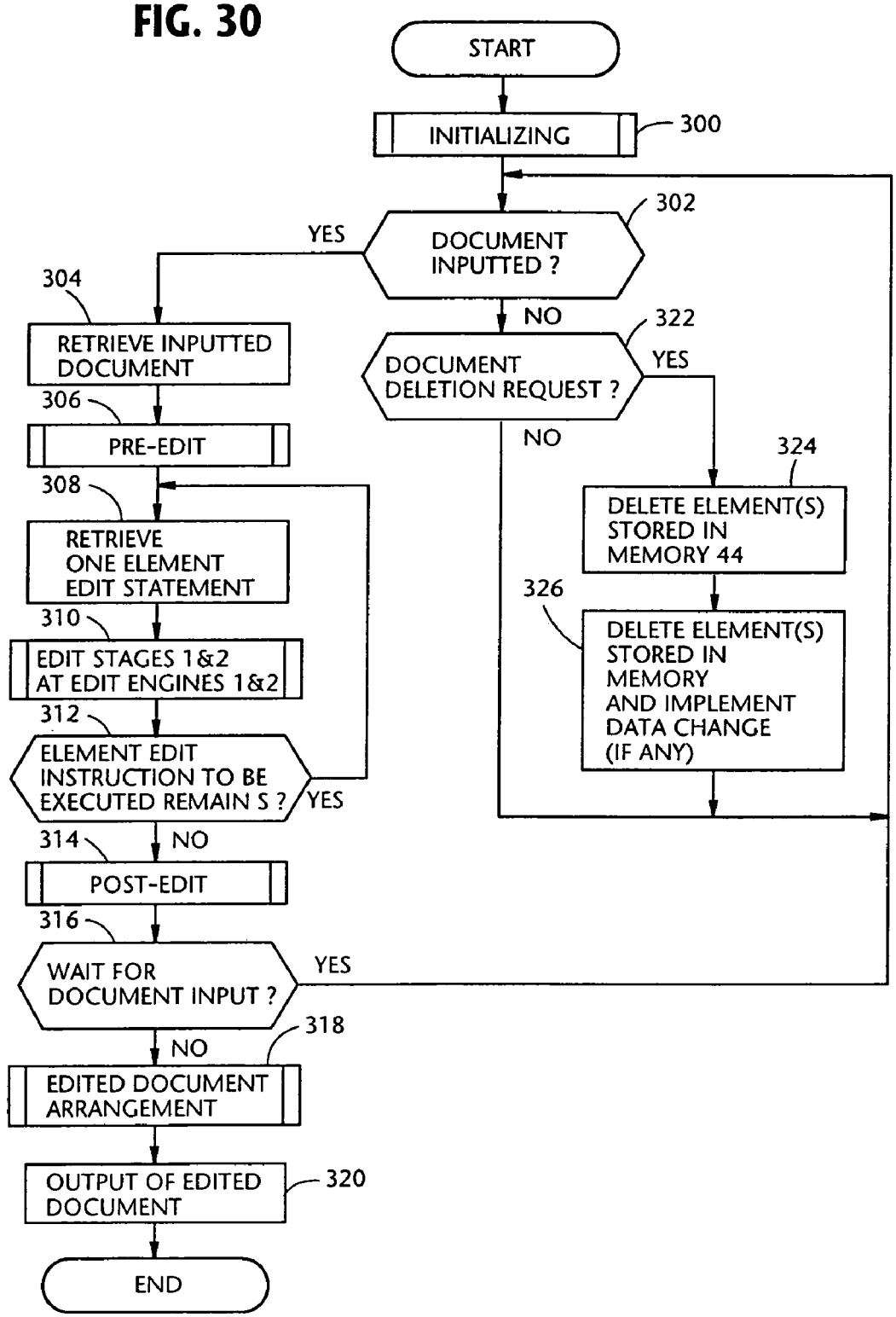
FIG. 30 is a flow chart which includes the steps which characterize the operation of the third embodiment.

A third embodiment of the present invention will be described with reference to FIGS. 29, 30, and 31(A)–31(C). The structured document edit system 30" of FIG. 29 differs from that of FIG. 19 in that the former arrangement further comprises an input document deletion request receiver 298. FIG. 30 is a flow chart which shows the steps which characterizes the operation of the third embodiment. On the other hand, each of FIGS. 31(A)–31(C) shows an output document generated from the system 30".

It will be understood that the above disclosure is representative of only three possible embodiments of the present invention, and that the concept on which the invention is based is not specifically limited thereto.

What is claimed is:

1. A method of editing a plurality of mark-up language structured documents each containing a plurality of structured elements and generating a resultant document reflecting the edit results, said method comprising the steps of:
 (a) acquiring a first and a second mark-up language structured document to be edited into a document edit system;
 (b) acquiring an element edit statement into said document edit system, said element edit statement comprising a plurality of edit instructions for searching for at least a first and a second desired element in the first and second mark-up language structured documents;
 (c) defining an element search portion in each of said first and second mark-up language structured documents, said element search portion of said first mark-up language structured document containing a plurality of elements in the first mark-up language structured document, and said element search portion of said second mark-up language structured document containing a plurality of elements in the second mark-up language structured document;
 (d) implementing match operations between desired elements defined in said element edit statement and each of the elements in said element search portion of each of said first and second mark-up language structured documents, and ascertaining at least a first and a second element of said element search portion of said first mark-up language structured document which match the first and second desired elements defined in said element edit statement respectively, and at least a third and a fourth element of said element search portion of said second mark-up language structured document which match the first and second desired elements defined in said element edit statement respectively, the matched elements being extracted from said first and second mark-up language structured documents, the extracted elements being stored in an edit result storage, said match operations being repeated until completing all the edit instructions in the element edit statement; and
 (e) generating said resultant document, wherein said resultant document includes an arrangement of elements extracted in step (d) such that said first and third elements are arranged together with each being arranged in association with said second and fourth elements respectively.

2. A method as claimed in claim 1, wherein said plurality of mark-up language structured documents are subject to editing on a document-by-document basis.

3. The method as claimed in claim 2, wherein the elements stored in said edit result storage are further edited before the step of generating the resultant document.

4. A method as claimed in claim 1, wherein the elements stored in said edit result storage are further edited before the step of generating the resultant document.

5. A method as claimed in claim 1, wherein said element edit statement contains a tag which is delimited using two selected characters, said tag being used to define a desired element.

6. A method as claimed in claim 1, wherein said element edit statement contains a character pattern consisting of normal text characters in sequence.

7. A method as claimed in claim 1, wherein said element edit statement contains a wild card tag which is defined by a selected character delimited using two selected characters, said wild card tag being used to determine structured layers in the element search portions of the first and second mark-up language structured documents.

8. A method as claimed in claim 1, wherein said element edit statement contains a negation indicator which is defined using a selected character and accompanies an element-defining name, said negation indicator being used to define and element wherein an element match is not established with a character sequence immediately following said negation indicator.

9. A method as claimed in claim 1, wherein said element edit statement contains an extraction indicator defined using a selected character and accompanying a character sequence, said extraction indicator being used to extract an element from the element search portions of the first and second mark-up language structured documents if said character sequence matches the element in the element search portions.

10. A method as claimed in claim 1, wherein said element edit statement contains a sequence connector defined by a selected character, said sequence connector accompanying two element-defining names at both sides of said sequence connector, said sequence connector specifying, in the element search portions of each of the first and second mark-up language structured documents, two elements positioned in the same order as said two element-defining names.

11. A method as claimed in claim 1, wherein said element edit statement contains a hierarchy connector defined by inserting no character between first and second element-defining names, said hierarchy connector being used to determine if an element defined by said first element-defining name involves an element defined by said second element-defining name.

12. A method as claimed in claim 1, wherein said element edit statement contains parentheses involving a plurality of element-defining names that are preferentially processed.

13. A method as claimed in claim 1, wherein said element edit statement contains an AND connector defined using a selected character and accompanying first and second element-defining names which are provided so as to sandwich said AND connector, said two element-defining names being used to determine if the element, which forms part of the element search portion and is defined by said first element-defining name, either follows or precedes the element which is defined by said second element-defining name.

14. A method as claimed in claim 13, wherein, if either of said first or second element-defining names sandwiching said AND connector specifies a corresponding element in either of the first and second mark-up language structured documents, a match is established therebetween and the corresponding element is extracted and stored in said edit result storage.

15. A method as claimed in claim 14, wherein if a match is established in connection with only one of said first and second element-definining names, the element already stored in said edit result storage is deleted therefrom.

16. A method as claimed in claim 1, wherein said element edit statement contains an OR connector defined using a selected character and accompanying first and second element-defining names which are provided in a manner to sandwich said OR connector, said two element-defining names being used to determine if an element, which is specified by either of said first and second element-defining names, is present in the element search portion of either of the first and second mark-up language structured documents.

17. A method as claimed in claim 1, further comprising: acquiring another element edit statement into said document edit system, said another element edit statement being used to edit the elements which have been extracted.

18. A method as claimed in claim 17, wherein said another element edit statement comprises another set of document editing instructions which are used for initializing a plurality of variables provided for editing the elements extracted, pre-editing, post-editing, and arranging the elements extracted.

19. The method as recited in claim 1 wherein said generating step (e) includes generating said resultant document which additionally includes a title heading of elements.

20. A method of editing a plurality of mark-up language structured documents and generating a resultant document reflecting the edit results, comprising the steps of:
(a) acquiring at least a first and a second mark-up language structured document in a document edit system;
(b) extracting at least a first and second element in the first mark-up language structured document and a third and fourth element in the second mark-up language structured document using an element edit statement which specifies the first and third elements to be extracted by a first common identifier or tag for mark-up language structured documents and specifies the second and fourth elements to be extracted by a second common identifier or tag for mark-up language structured documents, wherein the elements are extracted while the relationship of the first and second elements and the third and fourth elements is maintained; and
(c) generating said resultant document, wherein said resultant document includes an arrangement of elements extracted in step (b) such that said first and third elements are arranged together with each being arranged in association with said second and fourth elements respectively.

21. The method as recited in claim 20, wherein said generating step (c) includes generating said resultant document which additionally includes a title heading of elements.

* * * * *